United States Patent
Hiruma et al.

(10) Patent No.: US 9,206,312 B2
(45) Date of Patent: Dec. 8, 2015

(54) HEAT-SHRINKABLE FILM, MOLDED PRODUCT AND HEAT-SHRINKABLE LABEL EMPLOYING THE FILM, AND CONTAINER EMPLOYING THE MOLDED PRODUCT OR HAVING THE LABEL FITTED THEREON

(71) Applicant: Mitsubishi Plastics, Inc., Chuo-ku (JP)

(72) Inventors: Takashi Hiruma, Shiga (JP); Takeyoshi Yamada, Shiga (JP)

(73) Assignee: MITSUBISHI PLASTICS, INC., Chuo-ku (JP)

( * ) Notice: Subject to any disclaimer, the term of this patent is extended or adjusted under 35 U.S.C. 154(b) by 56 days.

(21) Appl. No.: 13/777,033

(22) Filed: Feb. 26, 2013

(65) Prior Publication Data

US 2013/0164468 A1 Jun. 27, 2013

Related U.S. Application Data

(62) Division of application No. 12/525,884, filed as application No. PCT/JP2008/051975 on Feb. 6, 2008, now Pat. No. 8,420,193.

(30) Foreign Application Priority Data

Feb. 6, 2007 (JP) ................. 2007-026670
Mar. 26, 2007 (JP) ................. 2007-079960

(51) Int. Cl.
*B32B 1/02* (2006.01)
*C08L 67/04* (2006.01)
(Continued)

(52) U.S. Cl.
CPC .. *C08L 67/04* (2013.01); *C08J 5/18* (2013.01); *C08L 23/0815* (2013.01); *C08L 23/10* (2013.01);
(Continued)

(58) Field of Classification Search
CPC ............... Y10T 428/1328; Y10T 428/1331; Y10T 428/1352; Y10T 428/31797; C08L 53/00; C08L 67/04; C08L 2666/04; C08L 2666/06; C08L 2666/18; C08L 33/06; C08J 2367/04; C08J 2433/06; C08J 5/18
USPC .................... 428/35.1; 525/94, 190
See application file for complete search history.

(56) References Cited

U.S. PATENT DOCUMENTS 4,670,529 A * 6/1987 Kitamura et al. .......... 526/348.1
5,180,765 A 1/1993 Sinclair
(Continued)

FOREIGN PATENT DOCUMENTS

EP 1 887 029 2/2008
JP 4-504731 8/1992
(Continued)

OTHER PUBLICATIONS

Machine Translation of JP 2006-008756 (Jan. 2006).*
(Continued)

*Primary Examiner* — Erik Kashnikow
(74) *Attorney, Agent, or Firm* — Oblon, McClelland, Maier & Neustadt, L.L.P.

(57) ABSTRACT

A heat-shrinkable film having a layer made of a mixed resin containing a polylactic acid resin and a polyolefin resin as the main components, wherein the mass ratio of the polylactic acid resin and the polyolefin resin is 95/5 to 50/50, the polylactic acid resin is a copolymer of D-lactic acid and L-lactic acid or a mixed resin of the copolymer, the D/L ratio of D-lactic acid and L-lactic acid is 3/97 to 15/85 or 85/15 to 97/3, the storage elastic modulus of the polyolefin resin or the soft acrylic resin at 20° C. is ≤100 MPa as measured at an oscillation frequency of 10 Hz and a strain of 0.1%, the film is stretched in at least one direction, and the heat shrinkage ratio of the film in the main shrinking direction is ≥20% as measured after the film is immersed in 80° C. water for 10 seconds.

14 Claims, 1 Drawing Sheet

(51) Int. Cl.
- *C08J 5/18* (2006.01)
- *C08L 23/08* (2006.01)
- *C08L 23/10* (2006.01)
- *C08L 23/06* (2006.01)
- *C08L 23/12* (2006.01)
- *C08L 33/06* (2006.01)
- *C08L 53/00* (2006.01)

(52) U.S. Cl.
CPC .......... *C08J 2367/04* (2013.01); *C08J 2423/04* (2013.01); *C08J 2423/08* (2013.01); *C08J 2423/10* (2013.01); *C08J 2423/14* (2013.01); *C08J 2433/06* (2013.01); *C08J 2453/00* (2013.01); *C08L 23/06* (2013.01); *C08L 23/12* (2013.01); *C08L 33/06* (2013.01); *C08L 53/00* (2013.01); *Y10T 428/1328* (2015.01); *Y10T 428/1331* (2015.01); *Y10T 428/1352* (2015.01); *Y10T 428/31797* (2015.04)

(56) References Cited

U.S. PATENT DOCUMENTS

| | | | |
|---|---|---|---|
| 5,216,050 | A | 6/1993 | Sinclair |
| 7,195,822 | B2 | 3/2007 | Hiruma et al. |
| 2006/0019111 | A1* | 1/2006 | Sawai et al. ............... 428/480 |
| 2007/0254118 | A1 | 11/2007 | Opusko et al. |
| 2009/0074999 | A1 | 3/2009 | Hiruma et al. |

FOREIGN PATENT DOCUMENTS

| | | | | |
|---|---|---|---|---|
| JP | 5-179110 | 7/1993 | | |
| JP | 8-300481 | 11/1996 | | |
| JP | 9-151310 | 6/1997 | | |
| JP | 9-169896 | 6/1997 | | |
| JP | 9-316310 | 12/1997 | | |
| JP | 10-114034 | 5/1998 | | |
| JP | 10-251498 | 9/1998 | | |
| JP | 2000-191895 | 7/2000 | | |
| JP | 2000-219803 | 8/2000 | | |
| JP | 2001-011214 | 1/2001 | | |
| JP | 2001-031853 | 2/2001 | | |
| JP | 2001-171059 | 6/2001 | | |
| JP | 2003-119367 | 4/2003 | | |
| JP | 2003-183488 | 7/2003 | | |
| JP | 2003-286400 | 10/2003 | | |
| JP | 2004-002776 | 1/2004 | | |
| JP | 2004-269720 | 9/2004 | | |
| JP | 2004-285258 | 10/2004 | | |
| JP | 2005-036054 | 2/2005 | | |
| JP | 2005-068232 | 3/2005 | | |
| JP | 2005-171204 | 6/2005 | | |
| JP | 2006-008756 | * | 1/2006 | ........... C08L 101/00 |
| JP | 2006-051826 | | 2/2006 | |
| JP | 2006-316137 | * | 11/2006 | ................ C08J 5/18 |
| JP | 2006-326952 | | 12/2006 | |
| JP | 2007-023145 | | 2/2007 | |
| JP | 2007-099952 | | 4/2007 | |

OTHER PUBLICATIONS

Supplementary Search Report issued Mar. 20, 2012, in European Application No. 08710871.8.

Office Action issued Sep. 25, 2012, in Japanese patent application No. 2008-027099 (w/English translation).

* cited by examiner (I)

(I)
(II)

(II)
(I)
(II)

(II)
(I)
(III)

(II)
(I)
(III)
(II)

HEAT-SHRINKABLE FILM, MOLDED PRODUCT AND HEAT-SHRINKABLE LABEL EMPLOYING THE FILM, AND CONTAINER EMPLOYING THE MOLDED PRODUCT OR HAVING THE LABEL FITTED THEREON

CROSS REFERENCE TO PRIOR RELATED APPLICATIONS

This is the U.S. National Phase Application under 35 U.S.C. §371 of International Patent Application No. PCT/JP2008/051975 filed Feb. 6, 2008, which claims the benefit of Japanese Patent Application No. 2007-026670 filed Feb. 6, 2006 and Japanese Patent Application No. 2007-079960 filed Mar. 26, 2007, both of which are incorporated by reference herein. The International Application was published in Japanese on Nov. 1, 2007 as WO 2008/096798 A1 under PCT Article 21 (2).

TECHNICAL FIELD

The present invention relates to a heat-shrinkable film, a molded product and a heat-shrinkable label employing the heat-shrinkable film, and a container to which the molded product or the label is fitted. More particularly, the present invention relates to a heat-shrinkable film which exhibits excellent shrinkable property and thermal resistance and which is applicable to shrinkable packing, shrinkable bond-packing, shrinkable label and the like. The present invention also relates to a molded product and a heat-shrinkable label employing the heat-shrinkable film, as well as a container employing the molded product or having the label fitted thereon.

BACKGROUND ART

At present, soft drinks such as juices, or alcoholic beverages such as beer are sold in a form that the drink is filled in containers such as glass bottles or PET (polyethylene terephthalate) bottles. When the drinks are on sale, in order to differentiate the product from other products and to improve its visibility for enhancing its commercial value, a heat-shrinkable label where printing is given thereon is provided around the outer surface of each container. Conventional examples of the material for the heat-shrinkable label include: polyvinyl chloride (PVC), polystyrene, and aromatic polyester.

On the other hand, recently, effective use of depletable resources becomes important and utilization of recyclable resources is the major issue. Now, the most attractive solution is the use of plant-derived plastics. The plant-derived plastics not only employ non-depletable resources as the base material and enable to save consumption of depletable resources at a time of plastic manufacturing, but also exhibit excellent recyclability.

Among the plant-derived plastic, particularly, polylactic acid resin attracts attention as an alternative for polystyrene and aromatic polyester (polyethylene terephthalate) in the field of film packaging material and injection molding, because polylactic acid resin is made of a lactic acid, as a base material, obtained by fermentation of starch, it can be mass productive in view of chemical engineering and exhibits excellent transparency and stiffness.

However, when polylactic acid is used as a base material of the heat-shrinkable label, although the label shows stiffness at room temperature, low-temperature shrinkage, and favorable natural shrinkage, the obtained label is extremely brittle and tends to cause uneven shrinkage and wrinkles at a time of thermal shrinkage, which is problematic. In addition, when the heat-shrinkable film made of polylactic acid is heated, crystallization is developed; thereby sufficient heat-shrinkable property cannot be obtained.

As a means to solve the above problems, a film made of polylactic acid resin in which copolymer ratio of L-lactic acid and D-lactic acid is adjusted is known (See Japanese Patent Application Laid-Open (JP-A) No. 2003-119367.). However, although the film can inhibit crystallization at a time of heating, problems of causing uneven shrinkage, wrinkles, and pocks by sudden shrinkage has not yet been solved, sufficiently.

Moreover, improvement of shrink finishing quality has been attempted by adjusting degree of crystallization of polylactic acid resin, blending aliphatic polyester resin, and so on (See JP-A No. 2001-011214.). However, compared with PVC series heat-shrinkable film, it cannot be said that the shrink finishing quality is sufficient.

Further, about polylactic acid resin, due to the brittleness of the material itself, when the polylactic acid resin is used solely to form a sheet, a film, or the like, sufficient strength cannot be obtained; hence it is difficult to use practically.

To the above problems, there are known methods by containing an aliphatic polyester other than polylactic acid (See JP-A No. 09-169896.), a polycaprolactone (See JP-A No. 08-300481.), a copolymer polyolefin such as ethylene-vinyl acetate copolymer (See JP-A No. 09-151310.), and soon. These methods are provided for the purpose of mainly improving brittleness of polylactic acid resin film while keeping its transparency; therefore, shrink finishing quality is still insufficient.

Still further, as means to improve brittleness of the polylactic acid resin, there are disclosed methods using: a film using polylactic acid and a polyolefin compound (See JP-A No. 2005-068232.); a molded product (See JP-A No. 09-316310.) and a composition (See JP-A No. 05-179110.) made of polylactic acid and a modified olefin compound; a molded product made of a polylactic acid and a syndiotactic polypropylene (See JP-A No. 10-251498.); a plasticized polylactic acid film made of: a polymer mainly containing lactic acid, an aliphatic carboxylic acid, and a plasticizer of an aliphatic polyester having liner molecule diol as the main component (See JP-A No. 2000-191895.); a biodegradability resin composition made of polylactic acid and an epoxidized diene block copolymer (See JP-A No. 2000-219803.); a lactic acid polymer composition made of polylactic acid, an aliphatic polyester, and polycaprolactone (See JP-A No. 2001-031853.); and a polylactic acid resin composition made of: a crystalline polylactic acid and at least one rubber component selected from natural rubber and a polyisoprene (See JP-A No. 2003-183488.).

When the above-described polycaprolactone, modified olefin compound, epoxidized diene block copolymer, natural rubber, polyisoprene, and the like are mixed with lactic acid resin, improvement of impact resistance can be observed. Nevertheless, as the trade-off, transparency is significantly deteriorated; therefore these arts are not sufficient for the use which requires checking the content of the packaging or the like.

In addition, a method to improve impact resistance by mixing polylactic acid resin with an impact-resistance improver for e.g. a multi-layer structure of which shell-layer includes: polyacetal resin and diene rubber, natural rubber, silicone rubber, polyurethane rubber, or methyl (meth)acrylate; and of which core-layer includes: at least one selected from styrene unit and butadiene unit (See JP-A No. 2003-286400.). However, the obtained heat-shrinkable film is not sufficient.

Further, a method by blending polylactic acid resin with a grafted copolymer obtained by graft polymerization of gum polymer and vinyl-monomer (See JP-A No. 2004-285258.) is proposed; the obtained heat-shrinkable film is not sufficient.

While, methods by mixing a polylactic acid resin and an acrylic base material (See JP-A No. 2004-269720 and JP-A No. 2005-171204.) are proposed; the methods are provided for the purpose of improving thermal resistance and transparency; therefore, it is difficult for the method to be adopted to improve rupture resistance. Further, an oriented film, in which a polylactic acid resin having a particular mass average molecular mass and a polymethacrylic acid ester resin are mixed, is known (See JP-A No. 2005-036059.). However, the art disclosed in Patent document 18 is provided for the purpose of mainly improving thermal resistance and transparency of polylactic acid resin film; hence, it is difficult for the method to be adopted to improve rupture resistance of the heat-shrinkable film of the present invention.

SUMMARY OF THE INVENTION

Accordingly, an object of the present invention is to obtain a heat-shrinkable film which shows low environmental burden as well as excellent heat-shrinkable property, impact resistance, transparency, mechanical property, and shrink finishing quality, and which is applicable for shrinkable packing, shrinkable bond-packing, and shrinkable label.

Another object of the invention is to obtain a molded product and a heat-shrinkable label employing the heat-shrinkable film which is applicable for shrinkable packing, shrinkable bond-packing, and shrinkable label, and to obtain a container employing the molded product or having the label fitted thereon.

The present invention can solve the above problems by providing a heat-shrinkable film consisting of a layer or comprising at least one layer, wherein the layer is made of a mixed resin containing a polylactic acid resin and a polyolefin resin as the main components, wherein mass ratio of the polylactic acid resin and the polyolefin resin is 95/5 to 50/50 by mass, the polylactic acid resin being a copolymer of D-lactic acid and L-lactic acid or a mixed resin of the copolymer, wherein D/L ratio of D-lactic acid and L-lactic acid is 3/97 to 15/85 or 85/15 to 97/3, the storage elastic modulus (E') of the polyolefin resin at 20 degree C. being 100 MPa or less as measured at an oscillation frequency of 10 Hz and a strain of 0.1%, the film being stretched in at least one direction, and the heat shrinkage ratio of the film in the main shrinking direction being 20% or more as measured after the film is immersed in hot water of 80 degree C. for 10 seconds.

The present invention can also solves the above problems by providing a heat-shrinkable film consisting of a layer or comprising at least one layer, wherein the layer is made of a mixed resin containing a polylactic acid resin and a soft acrylic resin as the main components, wherein mass ratio of the polylactic acid resin and the soft acrylic resin is 95/5 to 50/50 by mass, the polylactic acid resin being a copolymer of D-lactic acid and L-lactic acid or a mixed resin of the copolymer, the storage elastic modulus (E') of the soft acrylic resin at 20 degree C. being 100 MPa or less as measured at an oscillation frequency of 10 Hz and a strain of 0.1%, the film being stretched in at least one direction, and the heat shrinkage ratio of the film in the main shrinking direction being 20% or more as measured after the film is immersed in hot water of 80 degree C. for 10 seconds.

The other problems to be solved by the present invention can be solved by providing a molded product and a heat-shrinkable label independently using the film of the first or second invention as the base material, and by providing a container employing the molded product or having the label fitted thereon.

According to the present invention, since a stretched film, which is formed by a mixed resin including the polylactic acid resin and the polyolefin resin or the soft acrylic resin at a predetermined ratio and which has a predetermined heat shrinkage ratio, is employed, the film exhibits excellent heat-shrinkable property, impact resistance, mechanical property, and shrink finishing quality.

Further, according to the invention, it is capable of providing a molded product and a heat-shrinkable label employing the heat-shrinkable film which is applicable to shrinkable packing, shrinkable bond-packing, shrinkable label and the like, and also capable of providing a container employing the molded product or having the label fitted thereon.

DETAILED DESCRIPTION OF THE INVENTION

Figure 1A:
FIGS. 1(A) and 1(B) are cross-sectional views schematically showing modes of layer composition of the heat-shrinkable film of the present invention.

The heat-shrinkable film, the molded product, the heat-shrinkable label of the present invention, and the container of the invention employing the molded product or having the label fitted thereon (hereinafter, refer to as "film of the (present) invention", "molded product of the (present) invention", "label of the (present) invention", "container of the (present) invention".) will be more specifically described.

It should be noted that in this description, the term "as the main component" means to allow inclusion of other components within the range which does not damage action and effect of the resin composing each layer. Moreover, although the term does not restrict the content rate specifically, the content rate to the total mass of the components of each layer is 70% by mass or more, preferably 80% by mass or more, further preferably 90% by mass or more and 100% by mass or less.

[The Film of the Present Invention]

The film of the present invention is represented by a heat-shrinkable film (an embodiment) formed by a mixed resin containing a polylactic acid resin and a polyolefin resin as the main components and a heat-shrinkable film (another embodiment) formed by a mixed resin containing a polylactic acid resin and a soft acrylic resin as the main components.

First of all, resins to be used for the embodiments as well as the layer composition, etc. will be described in detail.

<Polylactic Acid Resin>

The polylactic acid resin used for the films of the embodiments means a homopolymer of D-lactic acid or L-lactic acid, or a copolymer of the both. In particular, the examples thereof include: a poly (D-lactic acid) whose structural unit is D-lactic acid; a poly (L-lactic acid) whose structural unit is L-lactic acid; and a poly (DL-lactic acid) which is a copolymer of L-lactic acid and D-lactic acid; further, a mixed resin composed of a plurality of the above copolymers, in which each copolymer has different copolymer ratio of D-lactic acid and L-lactic acid from the others.

The copolymer of the above L-lactic acid and D-lactic acid is determined at a copolymer ratio of D-lactic acid and L-lactic acid (hereinafter, refer to as "D/L ratio".) of 3/97 to 15/85 or 85/15 to 97/3, preferably 5/95 to 15/85 or 85/15 to 95/5, more preferably 8/92 to 15/85 or 85/15 to 92/8, and most preferably 10/90 to 15/85, or 85/15 to 90/10.

When copolymer ratio of D-lactic acid is more than 97 or less than 3, the obtained film tends to show high crystalline, high melting point, as well as excellent thermal resistance and mechanical property. However, when the film is used as a heat-shrinkable film, printing step and bag-making step using solvent are usually required; so, in order to improve printability and solvent seal property, crystalline of the composing materials itself has to be adequately reduced. While, when crystalline is extremely high, oriented crystallization is developed at a time of stretching; shrinkable property of the film at a time of heating tends to be deteriorated. In addition, even if crystallization of the film is inhibited by adjusting the stretching condition, prior to shrinkage, crystallization develops by the heat at a time of thermal shrinkage; as a result, uneven shrinkage and insufficient shrinkage tend to be caused.

On the other hand, when the copolymer ratio of D-lactic acid is less than 85 and more than 15, almost all crystalline disappears. As a consequence, when two or more labels butt after thermal shrinkage, troubles like fusion bonding by heat tend to be caused. Accordingly, by adjusting component rate of D-lactic acid and L-lactic acid of the polylactic acid resin within the above range, it becomes possible to obtain a heat-shrinkable film which does not cause the above problem but does exhibit excellent shrinkable property.

In the films of the embodiments, a plurality of polylactic acid resins, respective D/L ratio of which are different from each other, may be blended; rather, blending is preferable as it can easily adjust D/L ratio of polylactic acid resin. In this respect, average value of D/L ratio of a plurality of the lactic polymer may be adjusted to be within the above range. Depending on the intended purpose, by blending two or more polylactic acid resins, respective D/L ratio of which are different from each other, to adjust crystalline, it becomes possible to make a balance between thermal resistance and heat-shrinkable property.

About the polylactic acid resin, within the range where substantial property of the polylactic acid resin is not damaged, as a small amount of copolymer component, at least one selected from a group consisting of: non-aliphatic dicarboxylic acid such as α-hydroxy carboxylic acid and terephthalic acid other than lactic acid; aliphatic dicarboxylic acid such as succinic acid; non-aliphatic diol such as ethylene oxide adduct of bisphenol A; and aliphatic diol such as ethylene glycol, can be used. Moreover, for the purpose to increase molecular mass, a small amount of chain extender, for example, diisocyanate compounds, epoxy compounds, acid anhydride, and so on can be used.

Examples of α-hydroxy carboxylic acid unit other than lactic acid include: difunctional aliphatic hydroxy carboxylic acids such as glycolic acid, 3-hydroxy butyric acid, 4-hydroxy butyric acid, 2-hydroxy-n-butyric acid, 2-hydroxy-3,3-dimethyl butyric acid, 2-hydroxy-3-methyl butyric acid, 2-methyl lactic acid, and 2-hydroxy caproic acid; and lactones such as caprolactone, butyrolactone, and valerolactone.

Examples of the diol unit include: ethylene glycol, 1,4-butanediol and 1,4-cyclohexane dimethanol. Examples of the dicarboxylic acid unit include: succinic acid, adipic acid, suberic acid, sebacic acid, and dodecanedioate.

Copolymer ratio in a copolymer of lactic acid, and α-hydroxy carboxylic acid, etc. is not specifically restricted. When the ratio of lactic acid is higher, consumption of oil resources is less, which is preferable; the copolymer ratio is preferably determined in view of property balance among stiffness, transparency, impact resistance, and so on. More specifically, the copolymer ratio of a copolymer of lactic acid with α-hydroxy carboxylic acid other than lactic acid, aliphatic diol, or aliphatic dicarboxylic acid is: (lactic acid)/[α-hydroxy carboxylic acid other than lactic acid, aliphatic diol, or aliphatic dicarboxylic acid]=95/5 to 10/90, preferably 90/10 to 20/80, more preferably 80/20 to 30/70. When the copolymer ratio is within the above range, it is possible to obtain a film having a favorable property balance among stiffness, transparency, impact resistance, and so on. Also, examples of structure of these copolymers include: random copolymer, block copolymer, and grafted copolymer; any of these structures can be adopted. In view of film's impact resistance and transparency, block copolymer or grafted copolymer is preferable.

Mass-average molecular mass of the polylactic acid resin is 20,000 or more, preferably 40,000 or more, more preferably 60,000 or more; the upper limit is 400,000 or less, preferably 350,000 or less, more preferably 300,000 or less. When the mass-average molecular mass is 20,000 or more, adequate resin cohesive force can be obtained, which can inhibit insufficient strength of elongation and embrittlement of the film. On the other hand, when the mass-average molecular mass is 400,000 or less, it is capable of reducing melt viscosity so that it is preferable in view of manufacturing and productivity.

As polymerization methods of the polylactic acid resin, known methods such as condensation polymerization method and ring-opening polymerization method may be adopted. For example, with regard to condensation polymerization, by directly conducting dehydration condensation polymerization of D-lactic acid, L-lactic acid, or the mixture thereof, it is possible to obtain a polylactic acid resin having an arbitrary composition. While, with respect to the ring-opening polymerization method, by conducting ring-opening polymerization of lactide as a cyclic dimer of lactic acid in the presence of a predetermined catalyst by using modifier and so on as required, it is possible to obtain a polylactic acid resin having an arbitrary composition. Among the lactides, there is DL-lactide as a dimer of L-lactic acid; by conducting polymerization by mixing the DL-lactide as required, it is possible to obtain a polylactic acid resin having an arbitrary composition and crystalline.

Typical examples of polylactic acid resin suitably used for the present invention include: "LACEA" manufactured by Mitsui Chemicals, Inc. and "NATURE WORKS" manufactured by Nature Works LLC. as commercially available products. Specific example of random copolymer of poly lactic acid resin, diol, and dicarboxylic acid may be "GS-PLA" manufactured by Mitsubishi Chemical Corporation; specific examples of block copolymer or grafted copolymer may be "PLAMATE" manufactured by DIC Corporation.

<Polyolefin Resin>

The storage elastic modulus (E') at 20 degree C. of the polyolefin resin, which is used in the film of the first invention, is 100 MPa or less, preferably 80 MPa or less, more preferably 50 MPa or less, as measured at an oscillation frequency of 10 Hz and a strain of 0.1%. The lower limit of the storage elastic modulus (E'), in view of rigidity of the entire film (stiffness at room temperature), is preferably 0.1 MPa or more, more preferably 1.0 MPa or more, furthermore preferably 3.0 MPa or more. In the polyolefin resin which is used in the film of the first invention and whose storage elastic modulus (E') at 20 degree C. is within the above range, degree of crystallization and the density of polyolefin becomes lower; so average refractive index of the polyolefin resin also becomes lower, the refractive index can be approximated to that of polylactic acid resin to be mixed with. Thus, inner haze of the film of the first invention can be reduced so that the polyolefin resin is extremely useful for the purpose of improving rupture resistance and of maintaining transparency. When the storage elastic modulus (E') at 20 degree C. is 100 MPa or less, improved effect of rupture resistance is not lowered and occurrence of significant defective appearance can be inhibited. On the other hand, if the storage elastic modulus (E') of the polyolefin resin used for the film of the first invention is 0.1 MPa or more, significant reduction in rigidity of the entire film can be inhibited.

Moreover, the storage elastic modulus (E') at 70 degree C. of the polyolefin resin used for the film of the first invention, as measured at an oscillation frequency of 10 Hz and a strain of 0.1%, is preferably 50 MPa or less, more preferably 30 MPa or less, furthermore preferably 20 MPa or less, and most preferably 10 MPa. While, the lower limit of the storage elastic modulus (E') is preferably 0.1 MPa or more, more preferably 0.5 MPa or more, and furthermore preferably 1.0 MPa or more. When the film of the first invention is used as a shrinkable label for PET bottles, in the step for fitting label to an object to be fitted like a PET bottle, heat-shrink step is required. In addition, so as to inhibit deterioration of the contents, bursting, and so on, the heat-shrink step is carried out at a temperature between 60 and 100 degree C. Therefore, if the storage elastic modulus (E') at 70 degree C. of the polyolefin resin used in the film of the first invention is 50 MPa or less, sufficient heat shrinkage ratio of the film can be attained in the temperature range of heat-shrink step. When the storage elastic modulus (E') at 70 degree C. of the same is 0.1 MPa or more, in the temperature range of heat-shrink step, sufficient strength of the film can be maintained so that breakage, twist, and the like of the film are not caused. Thereby the film can easily fit to the object uniformly.

It should be noted that the storage elastic modulus (E') of the polyolefin resin can be derived by measuring dynamic viscoelasticity within the temperature range between −150 and 200 degree C. under conditions at temperatures of 20 degree C. and 70 degree C., an oscillation frequency of 10 Hz, a strain of 0.1%, a temperature increase rate of 2 degree C./min, and a distance between chucks of 2.5 cm.

In the film of the embodiment, magnitude of the storage elastic modulus (E') can be adjusted by raising or reducing the content of copolymer of $C_3$-$C_{20}$ α-olefin with the below-described ethylene. For instance, to raise the storage elastic modulus (E'), content of the copolymer of $C_3$-$C_{20}$ α-olefin with ethylene is reduced; meanwhile, to reduce the storage elastic modulus (E'), content of the copolymer of $C_3$-$C_{20}$ α-olefin with ethylene is raised.

In the film of the embodiment, the polyolefin resin to be used is not particularly limited as long as its storage elastic modulus (E') at 20 degree C. as measured at an oscillation frequency of 10 Hz and a strain of 0.1% satisfies the above range; in view of adjusting the storage elastic modulus (E') at 70 degree C. within the predetermined range, as well as in view of heat-shrinkable property, mechanical property, and formability, polyethylene resin, polypropylene resin, or a mixture thereof may be suitably used.

As below, examples of polyethylene resin and polypropylene resin, which are suitably used for the film of the embodiment, are shown.

As the polyolefin resin used for the film of the embodiment, there may be an ethylene copolymer such as a polyethylene resin, a polypropylene resin, an ethylene-vinyl acetate copolymer, an ethylene-ethyl acrylate copolymer, and an ethylene-methyl acrylate copolymer. Among them, from the viewpoint of heat shrinkage ratio and formability, polyethylene resin, polypropylene resin, or a mixture thereof may be suitably used. There are great variety of polyethylene resins and polypropylene resins obtained by various polymerization methods and various copolymer components; therefore, these are not particularly limited. Preferable types are shown below.

Examples of polyethylene resin used for the film of the first invention include: a medium-density polyethylene resin (MDPE) whose density is 0.92 g/cm$^3$ or more and 0.94 g/cm$^3$ or less; a low-density polyethylene resin (LDPE) whose density is less than 0.92 g/cm$^3$; and a linear low-density polyethylene (LLDPE). Among them, in view of elongation property, film's impact resistance, transparency, and so on, the linear low-density polyethylene (LLDPE) is particularly preferably used.

An example of the linear low-density polyethylene (LLDPE) may be copolymer of ethylene with $C_3$-$C_{20}$ α-olefin, preferably $C_4$-$C_{12}$ α-olefin. Examples of the α-olefin include: propylene, 1-butene, 1-pentene, 1-hexene, 1-heptene, 1-octene, 1-nonene, 1-decene, 3-methyl-1-butene, and 4-methyl-1-pentene. Among them, 1-butene, 1-hexene, and 1-octene are suitably used. The α-olefin to be copolymerized may be used individually or two or more compounds may be used in combination.

In the film of the embodiment, the polyolefin resin contains a polyethylene component; the content is preferably 70% by mass or more, and more preferably 75% by mass or more. If the content is 70% by mass or more, the entire film can keep its rigidity.

Particularly, density of the polyethylene resin is preferably 0.910 g/cm$^3$ or less, more preferably 0.905 g/cm$^3$ or less, and furthermore preferably 0.900 g/cm$^3$ or less. Although the lower limit is not specifically restricted, it is preferably 0.800 g/cm$^3$ or more, more preferably 0.850 g/cm$^3$ or more, and furthermore preferably 0.880 g/cm$^3$ or more. When the density is 0.910 g/cm$^3$ or less, the affinity with polylactic acid is enhanced and elongation property can be preferably maintained so that sufficient heat shrinkage ratio at operating temperature range (about 70-90 degree C.) can be obtained. On the other hand, when the density is 0.800 g/cm$^3$ or more, rigidity of the entire film (stiffness at room temperature) and thermal resistance are not significantly deteriorated; thereby it is practically preferable.

As the polyethylene resin, the resin of which melt flow rate (MFR) in accordance with JIS K7210 at 190 degree C. and a load of 21.18 N is 0.1 g/10 min or more and 10 g/10 min or less is preferably used. When the MFR is 0.1 g/10 min or more, extrusion workability can be favorably maintained; meanwhile, when MFR is 10 g/10 min or less, unevenness in thickness and lowering of dynamical strength of the laminated film tend to be inhibited; thus it is preferable.

Next, as a polypropylene resin used for the film of the first invention, there may be a homopropylene resin and a soft polypropylene resin which is more flexible than the homopropylene resin. Examples of the soft polypropylene resin may be a random polypropylene resin, a block polypropylene resin, and a propylene-ethylene rubber. Among these, in view of elongation property and rupture resistance, random polypropylene resin is particularly suitably used.

About the random polypropylene resin, the α-olefin to be copolymerized with propylene is preferably $C_2$-$C_{20}$ α-olefin, more preferably $C_4$-$C_{12}$ α-olefin; the examples thereof may be: ethylene, 1-butene, 1-pentene, 1-hexene, 1-heptene, 1-octene, 1-nonene, and 1-dencen. In the film of the first invention, in view of elongation property, heat-shrinkable property, film's impact resistance, transparency, stiffness, and so on, a random polypropylene whose content rate of propylene unit as the α-olefin is particularly preferably 80% by mass or more, preferably 85% by mass or more, more preferably 90% by mass or more. The α-olefin to be copolymerized may be used individually or two or more compounds may be used in combination.

The melt flow rate (MFR) of the polypropylene resin in accordance with JIS K7210 at 230 degree C. and at a load of 21.18 N is normally 0.5 g/10 min or more, preferably 1.0 g/10 min or more, and 15 g/10 min or less, preferably 10 g/10 min or less.

Specific examples of the polyethylene resin and polypropylene resin are shown below. As the polyethylene resin, examples of commercially available products include: commodity names: "NOVATECLD, LL", "KERNEL", and "TUFMER A, P" manufactured by Japan polyethylene Corporation; "SUNTEC HD, LD" manufactured by Asahi Kasei Chemicals Corporation; "HIZEX", "ULTZEX", and "EVOLUE" manufactured by Mitsui Chemicals, Inc.; "MORETEC" manufactured by Idemitsu Kosan Co., Ltd.; "UBE POLYETHYLENE" and "UMERIT" manufactured by Ube Industries, Ltd.; "NUC POLYETHYLENE" and "NUC-FLEX" manufactured by Nippon Unicar Company Limited; and "ENGAGE" manufactured by The Dow Chemical Company.

In addition, as the polypropylene resin, examples of commercially available products include: commodity names: "NOVATEC PP", "WINTEC", and "TUFMER XR" manufactured by Japan Polypropylene Corporation; "MITSUI POLYPRO" manufactured by Mitsui Chemicals, Inc.; "SUMITOMO NOBLEN", "TUF-SELEN", and "EXCELLEN EPX" manufactured by Sumitomo Chemical Co., Ltd.; "IDEMITSU PP" and "IDEMITSU TPO" manufactured by Idemitsu Kosan Co., Ltd.; "ADFLEX" and "ADSYL" manufactured by SunAllomer Ltd. These copolymers may be used individually or two or more compounds may be used in combination.

Moreover, in the film of the embodiment, as the polyolefin resin, a copolymer of the ethylene with a monomer which is copolymerizable with ethylene can be suitably used. Examples of the copolymer include: ethylene-vinyl acetate copolymer, ethylene-ethyl acrylate copolymer, and ethylene-methyl acrylate copolymer.

Ethylene content rate of the ethylene-vinyl acetate copolymer, ethylene-ethyl acrylate copolymer, and ethylene-methyl acrylate copolymer is desirably 70% by mass or more, preferably 75% by mass or more, and 95% by mass or less, preferably 90% by mass or less, furthermore preferably 85% by mass or less. When the ethylene content rate is 70% by mass or more, rupture resistance and shrinkable property of the entire film can be favorably maintained.

Examples of commercially available ethylene-vinyl acetate copolymer (EVA) include: "EVAFLEX" manufactured by Du Pont-Mitsui Polychemicals Co., Ltd.; "NOVATEC EVA" manufactured by Mitsubishi Chemical Corporation; "EVATHLENE" manufactured by DIC Corporation, and "EVATATE" manufactured by Sumitomo Chemical Co., Ltd. Examples of commercially available ethylene/ethyl acrylate copolymer (EEA) may be "EVAFLEX EEA" manufactured by Du Pont-Mitsui Polychemicals Co., Ltd.; examples of commercially available ethylene/methyl acrylate copolymer may be "ELVALOY AC" manufactured by Du Pont-Mitsui Polychemicals Co., Ltd.

MFR of the copolymer of the ethylene with the monomer which is copolymerizable with the ethylene is not particularly limited; the MFR in accordance with JIS K7210 at 190 degree C. and at a load of 21.18 N is normally desirably 0.5 g/10 min or more, preferably 1.0 g/10 min or more, and 15 g/10 min or less, preferably 10 g/10 min or less.

With regard to the polyolefin resin used for the film of the first invention, the lower limit of the mass-average molecular mass is 50,000, preferably 100,000, and the upper limit of the same is 700,000, preferably 600,000, and furthermore preferably 500,000. When the mass-average molecular mass of the polyolefin resin is within the above range, not only desirable practical properties such as mechanical property and thermal resistance can be attained, but also adequate melt viscosity can be obtained; whereby favorable formability can be obtained.

The manufacturing method of the above polyolefin resin is not particularly limited. Examples of the manufacturing method include: a known copolymerization method using a known catalyst for olefin copolymerization (for example, a multisite catalyst represented by Ziegler-Natta Catalyst and/or a singlesite catalyst represented by metallocen catalyst) such as slurry copolymerization, solution copolymerization, mass polymerization, and gas-phase polymerization; the example also include mass polymerization using radical initiator.

<Mass Ratio of Polylactic Acid Resin and Polyolefin Resin>

In the film it is important that mass ratio of the polylactic acid resin and the polyolefin resin is 95/5 to 50/50 by mass. The mass ratio is more preferably 90/10 to 60/40, furthermore preferably 85/15 to 70/30. By setting mass ratio of the polyolefin resin to the polylactic acid resin within the range of 5 or more, improved effect of the rupture resistance can be expected. On the other hand, by keeping mass ratio of the polyolefin resin to the polylactic acid resin within the range of 50 or less, rigidity of the entire film can be maintained.

<Soft Acrylic Resin>

Soft acrylic resin used for the film of the other embodiment is a flexible acrylic resin. Specifically, the storage elastic modulus (E') at 20 degree C., as measured at an oscillation frequency of 10 Hz and a strain of 0.1%, is 100 MPa or less, more preferably 50 MPa or less, and furthermore preferably 10 MPa or less. On the other hand, lower limit of the storage elastic modulus as measured under the same condition is 0.1 MPa or more and preferably 1.0 MPa or more.

When the storage elastic modulus at 20 degree C. is 100 MPa or less, the occurrence of significant poor appearance is inhibited with no sacrifice of improved effect of rupture resistance about the film of the second invention; while, the storage elastic modulus at 20 degree C. is 0.1 MPa or more, the rigidity of the entire film of the second invention can be maintained. In addition, since the acrylic resin and the polylactic acid resin are compatible, by mixing the polylactic acid resin and the soft acrylic resin whose storage elastic modulus within the above range, provision of rupture resistance and maintenance of transparency become compatible.

The soft acrylic resin used for the film of the other embodiment, is specifically preferably a soft acrylic resin including: at least a polymer block (A) including an acrylic acid ester (a); and at least a polymer block (B) including a (meth) acrylic acid ester (b-1) having a different chemical structure from that of the acrylic acid.

(Polymer Block (A))

The acrylic acid ester (a) used for forming the polymer block (A) is not specifically limited as long as it is an acrylic acid ester composed of acrylic acid component and alcohol component; it is preferably an acrylic acid ester having $C_1$-$C_{15}$ alcohol component. Examples of preferable acrylic acid ester include: primary acrylic acid alkyl ester such as methyl acrylate, ethyl acrylate, n-propyl acrylate, n-butyl acrylate, isobutyl acrylate, 2-ethylhexyl acrylate, and lauryl acrylate; and glycidyl acrylate, allyl acrylate, 2-methoxyethyl acrylate, 3-methoxybutyl acrylate, trimethoxysilyl propyl acrylate, trifluoroethyl acrylate, isopropyl acrylate, t-butyl acrylate, sec-butyl acrylate, cyclohexyl acrylate, isobornyl acrylate, and trimethylsilyl acrylate. The acrylic acid ester (a) may be used individually or two or more compounds may be used in combination.

(Polymer Block (B))

The (meth) acrylic acid ester (b-1) used for forming the polymer block (B) has a different chemical structure from that of the acrylic acid ester (a) used for forming the polymer block (A). It should be noted that in the description, the term "(meth) acryl" means "acryl or methacryl".

Typical examples of methacrylic acid ester usable as the (meth) acrylic acid ester (b-1) include: methacrylate alkyl ester such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, lauryl methacrylate; cycloalkyl methacrylate such as cyclohexyl methacrylate; aryl methacrylate such as phenyl methacrylate; aralkyl methacrylate such as benzyl methacrylate; glycidyl methacrylate; allyl methacrylate; trimethylsilyl methacrylate; trimethoxysilyl propyl methacrylate; and so on.

(Composition)

In the film of the other embodiment, as the acrylic acid ester (a) and the (meth) acrylic acid ester (b-1), one or a combination of two or more of the above-described polymerizable monomer can be used, respectively. Among the above typical examples, as the acrylic acid ester (a) and the (meth) acrylic acid ester (b-1), it is preferable to use at least one selected from the group consisting of: methyl methacrylate, ethyl acrylate, n-butyl acrylate, and 2-ethylhexyl acrylate, in view of properties of the obtained film.

(Structure)

About the block copolymer which is used for the film of the second invention and which has one or more polymer block (A) and one or more polymer block (B), number of polymer blocks, sequence of polymer blocks, molecular mass and stereoregularity of each polymer block, and molecular mass of the entire block copolymer are not specifically restricted. Only, the block copolymer capable of particularly favorably attaining the properties as a thermoplastic elastomer is preferably a block structure having three blocks or more including one or more polymer blocks (A) and two or more polymer blocks (B). For the purpose of manufacturing a block copolymer which exhibits excellent thermal resistance, stereoregularity in the polymer block (B) is adjusted to contain preferably 70% or more of syndiotacticity triad, more preferably 80% or more of syndiotacticity triad. In the purpose, methacrylic acid ester is mainly suitably used.

In the film of the other embodiment, particularly, using n-butyl acrylate as the acrylic acid ester (a) and methyl methacrylate as the (meth) acrylic acid ester (b-1) is preferable in view of properties of the obtained film. By mainly using both of the base materials, adjustment of the storage elastic modulus becomes easier. For example, storage elastic modulus can be decreased by increasing content of the n-butyl acrylate blocks; on the other hand, storage elastic modulus can be increased by increasing content of the methyl methacrylate.

The (meth) acrylic acid ester (b-1) in the soft acrylic resin used for the film of the second invention, more specifically, a methyl methacrylate, is preferably 5% by mass or more, more preferably 10% by mass or more, and furthermore preferably 20% by mass or more. The upper limit is preferably 60% by mass or less, preferably 50% by mass or less, and furthermore preferably 40% by mass or less. By setting the content rate of the methyl methacrylate within the above range, it is possible for the soft acrylic resin to have a predetermined storage elastic modulus.

(Molecular Mass)

In the film of the other embodiment, molecular mass of each polymer block and the entire block copolymer in the desired block copolymer can be adequately adjusted depending on the intended purpose. In general, number average molecular mass of the polymer block (A) is 1,000 or more and 1,000,000 or less; number average molecular mass of the polymer block (B) is 1,000 or more and 1,000,000 or less; and number average molecular mass of the entire block copolymer is 3,000 or more and 3,000,000 or less. By adjusting within the range, formability, handleability, and mechanical property of the obtained block copolymer become preferable.

Moreover, as for the soft acrylic resin used in the film of the second invention, the storage elastic modulus (E') at 70 degree C. as measured at an oscillation frequency of 10 Hz and a strain of 0.1% is preferably 0.1 MPa or more, more preferably 1.0 MPa or more, and preferably 50 MPa or less, more preferably 30 MPa.

For the purpose to set the storage elastic modulus at 70 degree C. of the soft acrylic resin used for the film of the second invention within the above range is to make rupture resistance and shrink finishing quality of the film of the second invention favorable. As it were, by adjusting the storage elastic modulus within the range of 50 MPa or less, rupture resistance of the film of the other embodiment can be enhanced further more.

When the film of the other embodiment is used as a shrinkable label for PET bottles, in the step for fitting label to an object to be fitted like a PET bottle, heat-shrink step is required. In addition, so as to inhibit deterioration of the contents, bursting, and so on, the heat-shrink step is carried out at a temperature of 60-100 degree C. Therefore, when the storage elastic modulus (E') at 70 degree C. of the polyolefin resin used in the film of the second invention is 0.1 MPa or more, in the heat-shrink step, sufficient strength of the film can be maintained so that breakage, twist, and the like are not caused; thereby the film can easily fit to the object uniformly. Also, when the storage elastic modulus (E') at 70 degree C. of the polyolefin resin used in the film of the second invention is 50 MPa or less, in the temperature range of heat-shrink step, sufficient heat shrinkage ratio of the film can be attained. Together with this, since the polylactic acid resin and the soft acrylic resin are compatible, glass transition temperature (Tg) of the film of the other embodiment can be adjusted so that the shrink start temperature can be adjusted and shrinking behavior is homogenized; thereby in the heat-shrink step, uneven shrinkage, wrinkles, and the like are hardly caused and favorable shrink finishing quality can be obtained. On the other hand, by adjusting the storage elastic modulus within the range of 0.1 MPa or more, when thermal shrinkage is carried out at a temperature of 60-80 degree C., favorable shrink finishing quality can be obtained by inhibiting significant drop of elastic modulus.

The melt flow rate (MFR) of the soft acrylic resin used in the film of the other embodiment in accordance with JIS K7210 at 190 degree C. and at a load of 21.18 N is normally 1.0 g/10 min or more, preferably 5.0 g/10 min or more, as well as 30 g/10 min or less, preferably 25 g/10 min or less, and more preferably 20 g/10 min or less.

An example of the soft acrylic resin may be commodity name: "LA POLYMER" manufactured by Kuraray Co., Ltd.

<Mass Ratio of Polylactic Acid Resin and Soft Acrylic Resin>

In the film of the other embodiment, it is important that mass ratio of the polylactic acid resin and the soft acrylic resin is 95/5 to 50/50 by mass. The mass ratio is more preferably 90/10 to 60/40, furthermore preferably 85/15 to 70/30. When mass ratio of the soft acrylic resin to the polylactic acid resin is set within the range of 5 or more, improvement of rupture resistance of the film of the second invention can be expected. On the other hand, by keeping mass ratio of the soft acrylic resin to the polylactic acid resin within the range of 50 or less, maintenance of rigidity about the entire film of the other embodiment becomes possible.

<Additives to the Mixed Resin>

Further, in the films of the embodiments, in the range which does not undermine the effect of these inventions, in the mixed resin, apart from the above-described polyolefin resin and soft acrylic resin, at least one or more selected from the group consisting of: a methyl methacrylate copolymer in which content rate of methyl methacrylate is respectively 70% by mass or more, a polyethylene resin, a polypropylene resin, a polystyrene resin (GPPS (General Purpose Polystyrene)), a HIPS (High Impact Polystyrene), a SBS (styrene-butadiene copolymer), a SIS (styrene-isoprene copolymer), a SEBS (styrene-ethylene-butylene-styrene copolymer), a SEPS (styrene-ethylene-propylene-styrene copolymer), a styrene-carboxylic acid copolymer) and the like; and a thermoplastic resin such as a polyamide resin and a polyoxymethylene resin, can be contained.

Particularly, since the (meth) acrylic resin is compatible with the polylactic acid resin, by blending with the polylactic acid resin, it becomes possible to adjust glass transition temperature that affects the shrinkable property; thus, the (meth) acrylic resin is the effective resin to improve shrink finishing quality.

Among the (meth) acrylic resins, methacrylic resin is preferable. The "methacrylic resin" means a homopolymer of methyl methacrylate or a copolymer of 50% by mass or more of a methyl methacrylate with other vinyl monomer. Examples of the vinyl monomer include: methacrylic acid esters, acrylic acid esters, unsaturated acids, styrene, α-methyl styrene, acrylonitrile, methacrylonitrile, maleic anhydride, phenyl maleimide, and cyclohexyl maleimide.

Specific examples of the methacrylic acid ester include: ethyl methacrylate, butyl methacrylate, cyclohexyl methacrylate, phenyl methacrylate, benzyl methacrylate, 2-ethylhexyl methacrylate, and 2-hydroxyethyl methacrylate.

Also, specific examples of the acrylic acid ester include: methyl acrylate, ethyl acrylate, butyl acrylate, cyclohexyl acrylate, phenyl acrylate, benzyl acrylate, 2-ethylhexyl acrylate, and 2-hydroxyethyl acrylate. Moreover, examples of the unsaturated acids may be methacrylic acid and acrylic acid.

The copolymer composing the above methacrylic resin may further contain: elastomer component such as polybutadiene, butadiene-butyl acrylate copolymer, and poly (butyl acrylate) copolymer; glutaric anhydride unit; and glutarimide unit.

Among these, in view of stiffness and formability, polymethyl methacrylate (PMMA) as a homopolymer of methyl methacrylate; and a copolymer obtained by at least two selected from the group consisting of: methyl methacrylate, ethyl methacrylate, butyl methacrylate, methyl acrylate, ethyl acrylate, butyl acrylate, acrylic acid, methacrylic acid, are suitably used.

In the films of the embodiments, polymethyl methacrylate (PMMA) is most suitably used. By blending the resin, it is capable of raising glass transition temperature of methacrylic resin. As a result, sudden start of shrinkage when shrinking is eased and favorable shrink finishing quality can be obtained.

Content of the (meth) acrylic resin is 5% by mass or more, preferably 10% by mass or more, furthermore preferably 15% by mass or more, and 30% by mass or less, preferably 25% by mass or less, more preferably 20% by mass or less.

Examples of commercially available products of the (meth) acrylic resin include: "SUMIPEX" manufactured by Sumitomo Chemical Co., Ltd., "ACRYPET" manufactured by Mitsubishi Rayon Co., Ltd., "PARAPET" manufactured by Kuraray Co., Ltd., "ALTUGLAS" manufactured by ATOFINA JAPAN CO., LTD., and "DELPET" manufactured by Asahi Kasei Chemicals Corporation.

Further, in the films of the embodiments, within the range which does not undermine the effect of the present invention, to the mixed resin, so as to improve properties like impact resistance, transparency, formability, and various properties of the heat-shrinkable film, soft-type resins may be added.

Examples of the soft-type resin include: an aliphatic polyester resin other than polylactic acid resin; an aromatic-aliphatic polyester resin; a copolymer of diol, dicarboxylic acid, and lactic acid resin; and a core-shell type rubber.

Among the soft-type resin, particularly, the aliphatic polyester resin other than polylactic acid resin is preferable. The "aliphatic polyester resin other than polylactic acid resin" means an aliphatic polyester mainly containing an aliphatic dicarboxylic acid or the derivatives thereof as well as an aliphatic polyvalent alcohol. Examples of the aliphatic dicarboxylic residue for composing the aliphatic polyester resin may be residues derived from succinic acid, adipic acid, suberic acid, sebacic acid, dodecanedioate, and so on. In addition, examples of aliphatic polyvalent alcohol residue may be aliphatic diol residues derived from ethylene glycol, 1,4-butanediol, 1,4-cyclohexane dimethanol, and so on.

The aliphatic dicarboxylic residue suitably used in the films of the embodiments is a succinic acid residue or an adipic acid residue; while, the aliphatic polyvalent alcohol residue is 1,4-butanediol residue.

Still further, about the aliphatic polyester resin suitably used in the films of the embodiments, the melting point is preferably within the range of 100 degree C. or more and 170 degree C. or less. By adjusting the melting point within the range, even within the temperature range between 60 and 100 degree C. where shrinkage is normally carried out, the aliphatic polyester resin can keep its crystalline state. As a consequence, by assuming a role of substantially column at a time of shrinkage, more favorable shrink finishing quality can be obtained.

Content of the aliphatic polyester resin other than the polylactic acid is 5% by mass or more, preferably 10% by mass or more, more preferably 15% by mass or more, and 30% by mass or less, preferably 25% by mass or less, more preferably 20% by mass or less.

As the core-shell type rubber, the following examples can be more suitably used. Among the rubber having core-shell structure, particularly, a silicone/acrylic complex rubber is suitably used. The specific examples may be a rubber whose core region is a copolymer of a siloxane compound with a (meth) acrylic monomer and whose shell region is a homopolymer or a copolymer of the (meth) acrylic monomer. Examples of the siloxane compound may be dimethyl siloxane. Examples of the (meth) acrylic monomer used for the core region may be butyl (meth)acrylate and 2-ethylhexyl acrylate. Examples of the (meth) acrylic monomer used for the shell region may be methyl (meth)acrylate.

Content of the core-shell type rubber to the total mass of the resin composing the film is 5% by mass or more, preferably 10% by mass or more, furthermore preferably 15% by mass or more, and 30% by mass or less, preferably 25% by mass or less, and more preferably 20% by mass or less.

In the films of the embodiments, in order to improve impact resistance, transparency, formability, and various properties of the heat-shrinkable film, in the range which does not significantly undermine the effect of these inventions, further, plasticizer may be added. Examples of the plasticizer include: fatty acid ester plasticizer, phthalic acid ester plasticizer, and trimellitic acid ester plasticizer.

Specific examples of the fatty acid ester plasticizer include: dibutyl adipate, diisobutyl adipate, diisononyl adipate, diisodecyl adipate, di (2-ethylhexyl) adipate, di (n-octyl) adipate, di (n-decyl) adipate, dibutyl diglycol adipate, dibutyl sebacate, di (2-ethylhexyl) sebacate, di (n-hexyl) azelate, di (2-ethylhexyl) azelate, and di (2-ethylhexyl) dodecane dionate.

The specific examples of phthalic acid ester plasticizer include: diisononyl phthalate, diisodecyl phthalate, and di (2-ethylhexyl) phthalate. Moreover, the specific examples of the trimellitic acid ester plasticizer may be tri (2-ethylhexyl) trimeritate.

<Manufacturing Method of the Film of the Present Invention>

The films of the embodiments can be manufactured by a known method using the above mixed resin. Shape of the film may be either planar or tubular; in view of productivity (several sets can be obtained as products in a width direction of the original film) and capability of printing on the inner surface, a planar shape is preferred.

An example of a manufacturing method of the planar film is as follows: a plurality of extruders are used to melt resins and co-extrusion is conducted through a T-die, cooling and solidifying by using chilled rolls, roll stretching in a longitudinal direction, and tenter stretching in a crosswise direction are carried out in the order described; then the rolled film is treated by annealing and the following cooling, (followed by applying the corona discharge treatment when printing is given); and finally a desired film can be obtained by winding with a winder. Furthermore, a method where a film produced by means of a tubular method is cut and opened into a planar shape can be applied as well.

Elongation magnification for applications of the film to be shrunk in two directions such as overlapping application, is twice or more and 10 times or less in the longitudinal direction, twice or more and 10 times or less in the crosswise direction. It is preferably 3 times or more and 6 times or less in the longitudinal direction and 3 times or more and 6 times or less in the crosswise direction. On the other hand, for applications of a film to be shrunk in mainly one direction such as application of heat-shrinkable label, the elongation magnification is desirably determined such that the magnification equivalent to that of the main shrinking direction is practically within the magnification range of monoaxial elongation, i.e. twice or more and 10 times or less, preferably 3 times or more and 7 times or less, more preferably 3 times or more and 5 times or less; the magnification of the direction perpendicular to the main shrinking direction is the same magnification or more and twice or less ("same magnification" means a case that the film is not elongated.), preferably 1.01 times or more and 1.5 times or less. When the film is elongated within the range of above elongation magnification so as to obtain a biaxially elongated film, the heat shrinkage ratio of the obtained film in the direction perpendicular to the main shrinking direction does not become too large. For example, when the film is used for a shrinkable label, the film is thermally shrunk to fit around a container even in the height direction, namely, it can inhibit shrinkage in the height direction; thereby it is preferable.

Elongation temperature needs to be changed depending on the glass transition temperature of resins to be used and properties required for the heat-shrinkable film. Overall, it is controlled in the range of 60 degree C. or more, preferably 70 degree C. or more, and the upper limit is 100 degree C. or less, preferably 90 degree C. or less.

Next, the stretched film, as required, for the purpose of reduction of natural shrinkage ratio and improvement of heat shrinkage property, is treated by tempering and relaxation within the temperature range of about 50 degree C. or more and 100 degree C. or less, and then quickly cooled within the time before the molecular orientation is loosening up, so as to obtain the heat-shrinkable laminated film.

In addition, as required, the films of the first and second inventions can be treated by surface-treatment and surface-processing such as corona discharge treatment, printing, coating, and vapor deposition; further, it can be treated by bag-making process with various solvents and heat-sealing as well as perforation-making process.

<Film Structure>

Figure 1B:
Figure 2A:
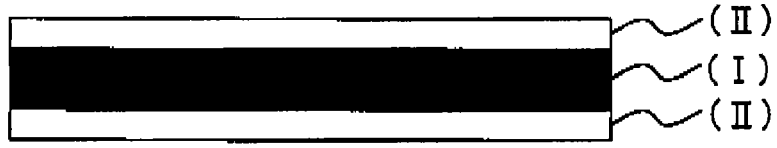
FIGS. 2(A), 2(B), and 2(C) are cross-sectional views schematically showing other modes of layer composition of the heat-shrinkable film of the invention.
Figure 2B:
Figure 2C:
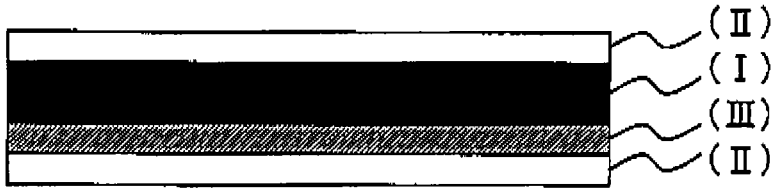

Layer composition of the films of the embodiments may be monolayer, or for the purpose to impart surface functional properties such as slidability, thermal resistance, solvent resistance, easy adhesiveness, and so on to the film's surface, laminated structure in which other layers are superposed on the above layer. In other words, it may be a laminated body having at least one layer made of the mixed resin. For instance, as shown in FIG. 1(A), the film may be composed of a monolayer of the layer (I) made of the mixed resin of the present invention. Alternatively, as shown in FIG. 1(B), the film may have a layer composition in which the other layer (II) made of different mixed resin and/or additives than those of the layer (I) is laminated over the layer (I) made of the mixed resin of the invention. Moreover, as shown in FIGS. 2(A), 2(B), and 2(C), examples of laminated films having layer compositions like (II)/(I)/(II), (II)/(I)/(III), and (II)/(I)/(III)/(II), in which the layers (II) and (III) respectively made of different mixed resin and/or additives are laminated over the layer (I) made of the mixed resin of the invention. In this respect, thickness ratio of each layer can be adequately adjusted depending on the intended purpose.

The suitable layer composition in the films of the first and second inventions is the case where the layer (II) contains polylactic acid resin as the main component. Particularly, D/L ratio of polylactic acid resin for forming the layer (II) is preferably different from the D/L ratio of polylactic acid resin for forming the layer (I). In the layers (I) and (II), by changing D/L ratio to make crystalline of individual layers differ from each other, more favorable shrink finishing quality can be attained.

Examples of the method for forming the above laminated body include: co-extrusion method, heat-sealing method by forming the individual films and superposing these films to thermally seal the films, and a method by joining the films using adhesives and the like.

In either case of the monolayer or the aminated body, total thickness of the film of the present invention is not specifically limited; in view of transparency, heat shrinkability, material cost, and so on, thinner film is preferable. Specifically, total thickness of the stretched film is 80 μm or less, preferably 70 μm or less, and furthermore preferably 50 μm. The lower limit of the film's thickness is not particularly limited; in view of handleability of the film, it is preferably 20 μm or more.

<Physical and Mechanical Properties>
(Shrinkage Ratio)

It is important that the heat shrinkage ratio of the films of the embodiments in the main shrinking direction is 20% or more, preferably 30% or more, as measured after immersing the film in hot water of 80 degree C. for 10 seconds.

This is an index to judge the adaptability of the film for the use of shrink labeling of PET bottles to the shrink processing within relatively short time (a few seconds to a dozen seconds). Nowadays, an industrially most popular heat shrink machine for labeling of PET bottles is the so-called "steam-shrinker" using steam as a heating medium for shrink processing. In view of influence of heat to the object having the label to be fitted thereon, the heat-shrinkable film must be sufficiently shrunk at a temperature as low as possible. However, when a film which exhibits high temperature dependence and whose shrinkage ratio is extremely varied depending on temperature, portions having different shrinking behavior tend to be caused by the uneven temperature in the steam-shrinker. Therefore, uneven shrinkage, wrinkles, pocks, and the like are caused; thereby the shrink finishing appearance tends to be deteriorated. From the viewpoint including industrial productivity, when the heat shrinkage ratio in the film's main shrinking direction is 20% or more as measured after immersing in hot water of 80 degree C. for 10 seconds, the film can sufficiently fit to the object within a predetermined period of shrink processing and can inhibit unevenness, wrinkles, and pocks; thus, it is preferable that favorable shrink finishing appearance can be obtained. Accordingly, heat shrinkage ratio of the films of the embodiments at 80 degree C. is more preferably 20% or more and 70% or less.

It should be noted that the term "main shrinking direction" means a direction, between the longitudinal direction and the width direction, where stretching size is larger; for example, when the film is fitted to a bottle, the main shrinking direction is equivalent to the circumferential direction of the bottle.

In addition, when the films of the first and second inventions are used as a heat-shrinkable label, the heat shrinkage ratio of the direction perpendicular to the main shrinking direction as measured after immersing in hot water of 80 degree C. for 10 seconds is preferably 10% or less, more preferably 5% or less, and furthermore preferably 3% or less. When the heat shrinkage ratio in the direction perpendicular to the main shrinking direction is 10% or less, the film hardly causes problems like shortening in dimension itself of the direction perpendicular to the main shrinking direction after shrinkage, deformation of printed images and letters on the film after shrinkage, and longitudinal shrinkage in case of square bottle; thus it is preferable.

Although the upper limit of the heat shrinkage is not described, the length of the shrunk film does not become shorter than that of the film before elongation so that the upper limit of the heat shrinkage is the heat shrinkage ratio such that length of the shrunk film is the same as that of the film before elongation.

(Transparency)

As for transparency of the films of the embodiments, when measuring a film having thickness of 50 μm in accordance with JIS K7105, the total haze is preferably 30% or less, more preferably 20% or less, furthermore preferably 15% or less, and most preferably 10% or less. Inner haze is preferably 15% or less, more preferably 12% or less, furthermore preferably 10% or less, and most preferably 6% or less. When the total haze is 30% or less, it is capable of maintaining visibility of the object having the film fitted thereon; when the inner haze is 15% or less, by inhibiting surface roughness of the film due to lamination of the films and so on, the total haze of the film can be further reduced; whereby its transparency can be improved furthermore.

(Rupture Elongation)

Impact resistance of the films of the embodiments can be evaluated by the rupture elongation. In a tensile test at 0 degree C., rupture elongation of the film, particularly for label application, in the film's drawing (flow) direction (MD: Machine Direction) is 100% or more, preferably 150% or more, furthermore preferably 200% or more. When the rupture elongation at 0 degree C. is 100% or more, problems like film breakage at a time of printing and bag-making can be hardly seen; thereby it is preferable. Further, even in a case where tensions of the film increases with speeding-up of printing and bag-making processes, the film is hard to be broken if it has rupture elongation of 150% or more. Thus it is preferable. The upper limit is not specifically limited. When considering the current processing speed, about 500% is thought to be sufficient; by contraries, when excessive stretch is given, stiffness of the film tends to be reduced.

In a tensile test at 23 degree C., rupture elongation of the films of the first and second inventions, particularly for label application, in the film's drawing (flow) direction (MD) is 100% or more, preferably 200% or more, and more preferably 300% or more. When rupture elongation at 23 degree C. is 100% or more, problems like film breakage at a time of printing and bag-making can be hardly seen; thereby it is preferable. Further, even in a case where tensions of the film increases with speeding-up of printing and bag-making processes, the film is hard to be broken if it has rupture elongation of 100% or more. Thus it is preferable.

(Storage Elastic Modulus (E'))

In the films of the embodiments, when dynamic viscoelasticity is measured in a direction perpendicular to the film's elongation direction within the measurement temperature range between −150 and 150 degree C. under conditions at an oscillation frequency of 10 Hz, a strain of 0.1%, a rate of temperature increase of 2 degree C./min, and a distance between chucks of 2.5 cm, storage elastic modulus (E') at 20 degree C. is preferably within the range of 1,000 MPa or more and 3,000 MPa or less, more preferably 1,200 MPa or more and 2,500 MPa or less. When the storage elastic modulus (E') of the film is 1,000 MPa or more, rigidity (stiffness at room temperature) of the entire film can be enhanced so that the following problems can be hardly caused: the film becomes extremely soft to be easily deformed and is elongated by roll tension at a time of secondary fabrication like printing and bag-making; in case of thin film, the film is fitted obliquely when the film made in a form of bag is fitted to containers like PET bottles by labeling machine and so on; and yield of the film declines due to the bending of the film. Thus it is preferable. On the other hand, the storage elastic modulus (E') of the film is 3,000 MPa or less, the film does not cause problems like: becoming solid and hard to be stretched; having wrinkles at a time of secondary fabrication and occurrence of rustle feel at a time of use, therefore it is preferable. So as to set the storage elastic modulus (E') at 20 degree C. in the direction perpendicular to the film's elongation direction within the range of 1,000 MPa or more and 3,000 MPa or less, it is essential that resin composition of each layer is in the range determined by the present invention. In case of monolayer film, the storage elastic modulus (E') can be adjustable by changing stiffness of the mixed resin and resin composition; while, in case of laminated film, the storage elastic modulus (E') can be adjustable by changing thickness of outer layer and inner layer to the thickness of the entire film. For example, when the storage elastic modulus (E') is required to be higher, it can be adjusted by raising thickness ratio of PLA (polylactic acid) layer to the entire laminated film and/or raising stiffness of the mixed resin layer.

(Strength of Interlayer Peeling)

Strength of interlayer peeling (sealing strength) of the films of the first and second inventions as a laminated layer is 2 N/15 mm width or more, preferably 4 N/15 mm width or more, and more preferably 6 N/15 mm width or more, as measured in accordance with a T-type peeling method at a test speed of 200 mm/min to peel in the TD direction (a main shrinking direction) under an environment at 23 degree C. and 50% RH. The upper limit of the strength of interlayer peeling is not particularly restricted; from the viewpoint of solvent resistance of the film surface, it is preferably 15 N/15 mm width or less. Even in case of laminated structure, the film of the invention has at least 2 N/15 mm width of strength of interlayer peeling; therefore it has few troubles like peeling of sealed portion at a time of use. As a means to secure the strength of interlayer peeling of the above film, it is primarily important to set the resin compositions of each layer within the range defined in the invention; it is particularly important to set the thickness of third layer to 0.5 μm or more and to compose the third layer with the resins defined in the invention.

(Natural Shrinkage Ratio)

In the films of the embodiments, the natural shrinkage ratio is preferably as small as possible. In general, natural shrinkage ratio of a heat-shrinkable film, for example, after 30 days storage under an environment at 30 degree C. and 50% RH, is preferably less than 3.0%, more preferably 2.0% or less, furthermore preferably 1.5% or less. If natural shrinkage ratio in the above condition is less than 3.0%, even though the produced film is stored for a long period, it can be stably fitted to containers and so on and hardly cause any problems. As a means to adjust the natural shrinkage ratio of the above film, it is primarily important to set the resin compositions of each layer within the range defined in the invention; it is particularly preferable to set thickness ratio of the mixed resin layer to 10% or more to the entire film.

<Molded Product, Heat-Shrinkable Label, Container>

The films of the embodiments can be provided for packaging from a planar form to a cylindrical form depending on the object to which the film is fitted. In case of cylindrical containers such as PET bottles whose outer surface need to be printed, firstly, necessary images are printed on the entire surface of a wide-width flat film wound by a roll, the printed film is cut into pieces having required width, then a piece of film is folded so as the printed surface thereof to become inner surface of the film, finally center seal (shape of seal portion is the so-called "envelop seams") is made to complete the cylindrical shape. Examples of methods of center sealing include: a method of adhesive bonding by organic solvent, a method by heat seal, a method by adhesive, and a method by impulse sealer. Among these, from the viewpoint of productivity and pleasing appearance, a method of adhesive bonding by organic solvent is suitably used.

Moreover, the films of the embodiments exhibit excellent heat-shrinkable property, shrink finishing quality, transparency, and the like, its usage is not particularly limited. As required, by forming printed layer, deposited layer and other functional layers in a form of laminated structure, the films can be used as molded products such as bottles (blown bottles), trays, lunch boxes, containers for food of delicatessen, and containers for dairy products.

Moreover, especially, when the films of the embodiments are used as heat-shrinkable labels for food containers (for instance, PET bottles for soft drinks or food, glass bottles, preferably PET bottles), the film is capable to adhere to complex shapes (e.g., cylindrical column, quadrangular prism, pentagonal prism, and hexagonal column respectively having corners, etc.) of containers; thus it is possible to obtain a container having a label fitted thereon in a pleasing appearance without having wrinkles and pocks. The molded products and containers of the invention can be produced by using conventional molding methods.

Further, the films of the embodiments exhibit excellent low-temperature shrinkage and shrink finishing quality so that it can be suitably used as a material of heat-shrinkable label for plastic molded articles being deformed by heating at high temperatures, but also it is used as materials of heat-shrinkable label for plastic packaging (containers) using materials as constituent thereof, whose thermal expansion rate and water absorption rate are extremely different from that of the heat-shrinkable film of the invention, for example at least one material selected from a group consisting of: metal, porcelain, glass, paper; polyolefin resin such as polyethylene, polypropylene, and polybutene; polymethacrylic acid resin; polycarbonate resin; polyester resin such as polyethylene terephthalate and polybutylene terephthalate; and polyamide resin.

Examples of material for forming the plastic packaging include: apart from the above resins, polystyrene, rubber-modified high impact polystyrene (HIPS), styrene-butyl acrylate copolymer, styrene-acrylonitrile copolymer, styrene-maleic anhydride copolymer, acrylonitrile-butadiene-styrene copolymer (ABS), (meth) acrylic acid-butadiene-styrene copolymer (MBS), polyvinyl chloride resin, phenolic resin, urea resin, melamine resin, epoxy resin, unsaturated polyester resin, silicone resin, and so on. These plastic packaging may be a mixture of two or more of these compounds or a laminated body.

EXAMPLES

Hereinafter, the film, label, and the container having the label fitted thereon of the present invention will be described by way of the following examples.

Measured value shown in the Examples and the evaluation are as follows. In the Examples, the laminated film's drawing (flow) direction is referred to as "longitudinal direction" (or "MD" (Machine Direction)), and a direction perpendicular to MD is referred to as cross-wise direction (or "TD" (Transverse Direction)).

<Measurement Method>

(1) Storage Elastic Modulus (E')

The polyolefin resin or the soft acrylic resin, both used for the present invention, were made into a sheet by heat stamping machine heated at a temperature range of 180-230 degree C. under the condition at a load of 20 MPa for 3 minutes and thereafter the sheet was immersed in cold water. The obtained film was cut into pieces having a size of 4 mm in width and 60 mm in length to make test pieces. Dynamic viscoelasticity about the respective test pieces were measured in the longitudinal direction by using viscoelastic spectrometer DVA-200 (produced by IT Measurement Co., Ltd.) under conditions at an oscillation frequency of 10 Hz, a strain of 0.1%, a temperature increase rate of 2 degree C./min, and a distance between chucks of 2.5 cm, measurement temperature range between −150 and 150 degree C. The storage elastic moduli (E') at 20 degree C. and 70 degree C. are shown in Tables 1 to 3.

The storage elastic modulus (E') of a mixture of two or more of the polyolefin resin was obtained from a pellet produced by feeding a mixed resin being mixed at a predetermined ratio into biaxial extruder (manufactured by MITSUBISHI HEAVY INDUSTRIES, LTD.) and melt-mixing thereof at 180 degree C.

(2) Heat Shrinkage Ratio

The obtained heat-shrinkable film was cut into pieces having a size of 100 mm in length and 100 mm in width, and the heat shrinkage ratio was measured after immersing the film in hot water of 80 degree C. for 10 seconds. The heat shrinkage ratio is defined by a ratio of the shrinkage amount to the original dimension before shrinkage in both the longitudinal direction and the width direction; the ratio is shown in % value.

(3) Rupture Elongation

The obtained heat-shrinkable film was cut into pieces having a size of 110 mm in a direction (longitudinal direction) perpendicular to the film's main shrinking direction and 15 mm in the film's main shrinking direction; the rupture elongation of the direction (longitudinal direction) perpendicular to the film's main shrinking direction was measured in accordance with JIS K6732 at a tension rate of 100 mm/min and at 0 degree C. and 23 degree C. Average of values of 10 times measurement was calculated and evaluated based on the following criteria. The measured value and result of the evaluation is shown in Tables 1 to 3.

⊚ (excellent): rupture elongation is over 200%;
○ (good): rupture elongation is over 100% and 200% or less;
x (bad): rupture elongation is 100% or less.

(4) Haze

So as to evaluate transparency of the obtained film, haze was measured in accordance with JIS K7105 and evaluated based on the following criteria. Measurement of haze was carried out about the total haze and the inner haze of the film.

⊚ (excellent): inner haze is 10% or less, total haze is 15% or less;
○ (good): inner haze is over 10% and 20% or less, and/or total haze is over 15% and 30% or less;
x (bad): inner haze is over 20%, and/or total haze is over 30%.

(5) Appearance

Appearance of the obtained film (transparency/surface shape) was evaluated based on the following criteria.

⊚ (excellent): transparency and surface shape are both excellent;
○ (good): either transparency or surface shape slightly has problems; however, it is practically no problem;
x (bad): both transparency and surface shape are problematic and the appearance is bad.

(6) Shrink Finishing Quality

A film, on the surface of which grid network at 10 mm interval had been printed, was cut into pieces having a size of 170 mm in MD and 114 mm in TD. Portions of 10 mm at both ends of the film in crosswise direction were overlapped each other and adhered by tetrahydrofuran (THF) solvent so as to make a cylindrical film. The cylindrical film was applied on a surface of cylindrical PET bottle having a capacity of 500 mL and the covered bottle was come through the steam-heating type shrinkage tunnel, of which length is 3.2 m (3 zones), within about 4 seconds without rotation to fit the film to the bottle. The atmospheric temperature in each zone of the tunnel was set within the range between 70 and 90 degree C. by adjusting the steam flow by flow control valve.

After film coverage, shrink finishing quality was evaluated in line with the following criteria.

⊚ (excellent): shrinkage is sufficient and no wrinkle, pock, whitening effect, and distortion of the grid network are produced;
○ (good): shrinkage is sufficient; although wrinkles, pocks, whitening effect, and distortions of the grid network are slightly produced, it is practically no problem;
x (bad): shrinkage is insufficient, or wrinkles, pocks, or distortions of the grid network are significantly observed.

Base materials used in each Examples and Comparative examples are as below.

(Polylactic Acid Resin)

Polylactic acid resin . . . commodity name: NATURE WORKS 4050 manufactured by Nature Works LLC, L/D ratio=95/5 (hereinafter, refer to as "NW4050")

Polylactic acid resin . . . commodity name: NATURE WORKS 4060 manufactured by Nature Works LLC, L/D ratio=88/12 (hereinafter, refer to as "NW4060")

Polylactic acid resin . . . commodity name: NATURE WORKS 4042D manufactured by Nature Works LLC, L/D ratio=95.75/4.25 (hereinafter, refer to as "NW4042".)

Copolymer of polylactic acid resin, diol, and dicarboxylic acid . . . commodity name: PLANATE PD150 manufactured by DIC Corporation (hereinafter, refer to as "PD150")

(Polyolefin Resin)

Commodity name: TUF-SELEN 3512 manufactured by Sumitomo Chemical Co., Ltd. [TUF-SELEN stock solution X1102 (85% by mass)/random polypropylene (15% by mass), storage elastic moduli at an oscillation frequency of 10 Hz: 3 MPa (20 degree C.) and 2 MPa (70 degree C.), TUF-SELEN stock solution: a propylene-butane copolymer] (hereinafter, refer to as "T3512".)

Commodity name: VERSIFY 2300 manufactured by The Dow Chemical Company, polypropylene-ethylene random copolymer [polypropylene/ethylene=88/12, storage elastic moduli at an oscillation frequency of 10 Hz: 45 MPa (20 degree C.) and 8 MPa (70 degree C.)] (hereinafter, refer to as "V2300".)

Polyolefin resin . . . commodity name: KERNEL KS240T manufactured by Japan polyethylene Corporation, specific gravity: 0.880, ethylene-propylene-(1-hexene) copolymer (=77/8/15) (hereinafter, refer to as "KS240T".)

Polyolefin resin . . . commodity name: EVAFLEX EV270 manufactured by Du Pont-Mitsui Polychemicals Co., Ltd., ethylene-vinyl acetate copolymer (=72/28) (hereinafter, refer to as "EV270".)

Commodity name: MODIPER A5200 manufactured by NOF CORPORATION. [(ethylene-ethyl acrylate)-methyl methacrylate grafted copolymer (=70/30), storage elastic moduli at an oscillation frequency of 10 Hz: 85 MPa (20 degree C.) and 14 MPa (70 degree C.)] (hereinafter, refer to as "A5200".)

Commodity name: VERSIFY 2400 manufactured by The Dow Chemical Company, polypropylene-ethylene random copolymer [polypropylene/ethylene=85/15, storage elastic moduli at an oscillation frequency of 10 Hz: 10 MPa (20 degree C.) and 3 MPa (70 degree C.)] (hereinafter, refer to as "V2400".)

(Soft Acrylic Resin)

Soft acrylic resin . . . commodity name: LA2250 manufactured by Kuraray Co., Ltd., methyl methacrylate-(n-butyl acrylate) block copolymer (=30/70) (hereinafter, refer to as "LA2250".)

[Other Resins]
(Hard Acrylic Resin)

Acrylic resin . . . commodity name: ACRYPET VH01 manufactured by Mitsubishi Rayon Co., Ltd., methyl methacrylate resin (hereinafter, refer to as "VH01".)

acrylic resin . . . commodity name: SUMIPEX FA manufactured by Sumitomo Chemical Co., Ltd., methyl methacrylate-(n-butyl acrylate) random copolymer (=60/40) (hereinafter, refer to as "FA".)

Acrylic resin . . . commodity name: SUMIPEX LG21 manufactured by Sumitomo Chemical Co., Ltd., specific gravity: 1.19, methacrylic resin (hereinafter, refer to as "LG21".)

Acrylic resin . . . commodity name: SUMIPEX HT50Y manufactured by Sumitomo Chemical Co., Ltd., specific gravity: 1.17, methacrylic resin (hereinafter, refer to as "HT50Y".)

(Conventional Polypropylene Resin)

Polyolefin resin . . . commodity name: NOVATEC FY6H manufactured by Japan Polypropylene Corporation, polypropylene polymer (hereinafter, refer to as "FY6H".)

(Conventional Polyethylene Resin)

Polyethylene resin . . . commodity name: KERNEL KF271 manufactured by Japan polyethylene Corporation, polyethylene polymer (hereinafter, refer to as "KF271".)

(Aliphatic Polyester)

Aliphatic polyester . . . commodity name: GS-Pla AZ 91T manufactured by Mitsubishi Chemical Corporation (polybutylene succinate) (hereinafter, refer to as "GS-Pla".)

(Soft Resin Other than Soft Polypropylene)

Silicone/acrylic complex rubber . . . commodity name: METABLEN S2001 manufactured by Mitsubishi Rayon Co., Ltd., core-shell structure: silicone-acrylic copolymer (hereinafter, refer to as "S2001".)

Examples 1 to 12

Comparative Examples 1 to 7

As for the first layer (monolayer) (Examples 1 to 12, Comparative examples 1 to 7), a mixed resin obtained by mixing the polylactic acid resin and the soft acrylic resin or the polyolefin resin respectively shown in Table 1 or 3, was fed into a biaxial extruder (manufactured by MITSUBISHI HEAVY INDUSTRIES, LTD.) and melt-mixed at a set temperature of 200 degree C.; after conducting extrusion from the extruding gate at a set temperature of 200 degree C., the obtained film was drawn by castroll heated at 50 degree C., then cooled and solidified to obtain a non-elongated laminated sheet having a size of 200 mm in width and 250 μm in thickness. Thereafter, by use of film tentering machine manufactured by KYOTO MACHINERY CO., LTD., the film was elongated in the width direction under the conditions shown in Table 1 or 3 to obtain a heat-shrinkable film.

Examples 13 to 29

In addition to the first layer, as laminated films (Examples 13 to 29) having a second layer made of polylactic acid resin, pellet produced by feeding a mixed resin composing the first layer into the biaxial extruder (manufactured by MITSUBISHI HEAVY INDUSTRIES, LTD.) and melt-mixing at a set temperature of 210 degree C. and a mixed resin composing the second layer were respectively fed into the corresponding monoaxial extruders (manufactured by MITSUBISHI HEAVY INDUSTRIES, LTD.); after melt-mixing in each extruder at the set temperature of 210 degree C., co-extrusion through three-layer two-kind dies was conducted so as to have a film whose thickness of each layer is: (the second layer)/(the first layer)/(the second layer)=30 μm/190 μm/30 μm. The obtained film was drawn by castroll heated at 50° C., then cooled and solidified so as to obtain a non-elongated laminated sheet of 200 mm in width and 250 μm in thickness. Thereafter, by use of film tentering machine manufactured by KYOTO MACHINERY CO., LTD., the film was elongated in the width direction under the conditions shown in Table 1 or 2 to obtain a heat-shrinkable film. The evaluation results of the obtained film are shown in Table 1 or 2.

TABLE 1

| | | | | | Examples | | | | | | | | | | | | | |
|---|---|---|---|---|---|---|---|---|---|---|---|---|---|---|---|---|---|---|
| Layer composition | | | | 1 | 2 | 3 | 4 | 5 | 6 | 7 | 8 | 9 | 10 | 11 | 12 | 13 | 14 | 15 |
| Film composition | 1st layer | PLA resin (% by mass) | NW4050 | 80 | 90 | 80 | 80 | 80 | | | | | | | | | | |
| | | | NW4060 | | | | | | 47 | 40 | 47 | 40 | 47 | 80 | 90 | 40 | 33 | 27 |
| | | | NW4042 | | | | | | 23 | 20 | 23 | 20 | 23 | | | 20 | 17 | 13 |
| | | | D/L ratio | 5 | 5 | 5 | 5 | 5 | 9.5 | 9.4 | 9.5 | 9.4 | 9.5 | | | 9.4 | 9.4 | 9.5 |
| | | PO resin (% by mass) | T3512 | 20 | 10 | | | | | | | | | | | | | |
| | | | V2300 | | | 20 | | | | | | | | | | | | |
| | | | V2400 | | | | 20 | | 20 | 30 | 25 | 35 | 28 | | | 27 | 27 | 27 |
| | | | KS240T | | | | | 20 | | | | | | | | | | |
| | | | EV270 | | | | | | 10 | 10 | 5 | 5 | 2 | | | 3 | 3 | 3 |
| | | Soft AC resin (% by mass) | A5200 | | | | | | | | | | | 20 | 10 | | | |
| | | Other resins (% by mass) | LG21 | | | | | | | | | | 15 | | | 10 | 20 | 30 |
| | | Storage elastic modulus of PO or Soft AC resin (10 Hz) | 20° C. (MPa) | 3 | 3 | 45 | 31 | 29 | 35 | 29 | 23 | 20 | 15 | 3 | 3 | 18 | 18 | 18 |
| | | | 70° C. (MPa) | 2 | 2 | 8 | 2 | 2 | 6 | 5 | 5 | 4 | 3 | 2 | 2 | 4 | 4 | 4 |
| | Mass ratio of PLA/(PO or Soft AC) resin (equiv. 100% by mass) | | | 80/20 | 90/10 | 80/20 | 80/20 | 80/20 | 70/30 | 60/40 | 70/30 | 60/40 | 70/30 | 80/20 | 90/10 | 67/33 | 63/37 | 57/43 |
| | 2nd layer | PLA resin | NW4050 | | | | | | | | | | | | | 60 | 60 | 60 |
| | | | NW4060 | | | | | | | | | | | | | 30 | 30 | 30 |
| | | | NW4042 | | | | | | | | | | | | | 10 | 10 | 10 |
| | | | PD150 | | | | | | | | | | | | | | | |
| | | D/L ratio | | | | | | | | | | | | | | 9.4 | 9.4 | 9.4 |
| | Elongation in the crosswise direction | Preheating temperature | | 74 | 74 | 74 | 76 | 76 | 80 | 80 | 80 | 80 | 80 | 74 | 74 | 85 | 85 | 85 |
| | | Elongation temperature | | 69 | 69 | 69 | 71 | 71 | 75 | 75 | 75 | 75 | 75 | 69 | 69 | 80 | 80 | 80 |
| | | Magnification (times) | | 4 | 4 | 4 | 4 | 4 | 5 | 5 | 5 | 5 | 5 | 4 | 4 | 5 | 5 | 5 |
| | Film thickness (μm) | | | 50 | 50 | 50 | 50 | 50 | 50 | 50 | 50 | 50 | 50 | 50 | 50 | 50 | 50 | 50 |
| | Heat shrinkage ratio (80° C.) | Longitudinal dir. (%) | | 9 | 5.3 | 10 | 8 | 8 | −0.2 | −0.1 | −0.3 | −0.8 | −1.3 | 7.7 | 2.7 | −3.8 | −4.3 | −5.2 |
| | | Crosswise dir. (%) | | 54 | 63 | 61 | 63 | 68 | 39 | 39 | 40 | 38 | 38 | 66 | 74 | 37 | 41 | 43 |
| Evaluation | Haze (%) (Entire/inner) | | | (10/2.8) | (7/2.5) | (9/3.4) | (18/8) | (19/12) | (16.5/7.3) | (21.9/8.0) | (19.4/7.1) | (25.8/6.3) | (24.4/6.7) | (2/0.9) | (1.7/0.8) | (4.1/2.7) | (3.2/1.5) | (2.9/0.7) |
| | Rupture elongation (%) | 23° C. | | 330 | 332 | 346 | 418 | 495 | 229 | 411 | 492 | 568 | 452 | 527 | 444 | 426 | 353 | 226 |
| | | 0° C. | | 356 | 383 | 381 | 456 | 390 | 212 | 500 | 259 | 395 | 296 | 461 | 380 | 314 | 302 | 180 |
| | Appearance | | | ◐ | ◐ | ● | ◐ | ○ | ○ | ○ | ○ | ○ | ○ | ● | ● | ● | ● | ○ |
| | Shrink finishing quality | | | ● | ● | ● | ◐ | ◐ | ◐ | ◐ | ◐ | ◐ | ◐○ | ● | ● | ● | ● | ● |
| | Comprehensive evaluation | | | ◐ | ◐ | ● | ○ | ○ | ○ | ○ | ○ | ○ | ○ | ● | ● | ● | ● | ○ |

TABLE 2

| Layer composition | | | Examples | | | | | | | | | | | | |
|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 |
| Film composition | 1st layer | PLA resin (% by mass) | NW4050 | | | | | | | | | | | | | |
| | | | NW4060 | 40 | 33 | | 47 | 40 | 47 | 40 | 47 | 40 | 47 | 40 | 47 | 40 | 40 |
| | | | NW4042 | 20 | 17 | 70 | 23 | 20 | 23 | 20 | 23 | 20 | 23 | 20 | 23 | 20 | 20 |
| | | D/L ratio | | 9.4 | 9.4 | 12 | 9.5 | 9.4 | 9.5 | 9.4 | 9.5 | 9.4 | 9.5 | 9.4 | 9.5 | 9.4 | 9.4 |
| | | PO resin (% by mass) | T3512 | | | 20 | | | | | | | | | | | |
| | | | V2300 | | | | | | | | | | | | | | |
| | | | V2400 | 27 | 27 | | 20 | 30 | 25 | 35 | 27 | 37 | 28 | 38 | 29 | 39 | 40 |
| | | | KS240T | | | | | | | | | | | | | | |
| | | | EV270 | | | | | | | | | | | | | | |
| | | Other resins (% by mass) | A5200 | 3 | 3 | 10 | | 10 | 5 | 5 | 3 | 3 | 2 | 2 | 1 | 1 | |
| | | | S2001 | 10 | 20 | | 10 | | | | | | | | | | |
| | | | HT50Y | | | | | | | | | | | | | | |
| | | Storage elastic modulus of PO or Soft AC resin (10 Hz) | 20° C. (MPa) | 18 | 18 | 3 | 35 | 29 | 23 | 20 | 18 | 16 | 15 | 14 | 13 | 12 | 10 |
| | | | 70° C. (MPa) | 4 | 4 | 2 | 6 | 5 | 5 | 4 | 4 | 4 | 3 | 3 | 3 | 3 | 3 |
| | | Mass ratio of PLA/(PO or Soft AC) resin (equiv. 100% by mass) | | 67/33 | 63/37 | 78/22 | 70/30 | 60/40 | 70/30 | 60/40 | 70/30 | 60/40 | 70/30 | 60/40 | 70/30 | 60/40 | 60/40 |
| | 2nd layer | PLA resin | NW4050 | | | 45 | | | | | | | | | | | |
| | | | NW4060 | 60 | 60 | 45 | 60 | 60 | 60 | 60 | 60 | 60 | 60 | 60 | 60 | 60 | 60 |
| | | | NW4042 | 30 | 30 | | 30 | 30 | 30 | 30 | 30 | 30 | 30 | 30 | 30 | 30 | 30 |
| | | | PD150 | 10 | 10 | 10 | 10 | 10 | 10 | 10 | 10 | 10 | 10 | 10 | 10 | 10 | 10 |
| | | D/L ratio | | 9.4 | 9.4 | 8.5 | 9.4 | 9.4 | 9.4 | 9.4 | 9.4 | 9.4 | 9.4 | 9.4 | 9.4 | 9.4 | 9.4 |
| Elongation in the crosswise direction | | Preheating temperature | | 85 | 85 | 74 | 80 | 80 | 80 | 80 | 80 | 80 | 80 | 80 | 80 | 80 | 80 |
| | | Elongation temperature | | 80 | 80 | 69 | 75 | 75 | 75 | 75 | 75 | 75 | 75 | 75 | 75 | 75 | 75 |
| | | Magnification (times) | | 5 | 5 | 4 | 5 | 5 | 5 | 5 | 5 | 5 | 5 | 5 | 5 | 5 | 5 |
| Evaluation | Film thickness (μm) | | | 50 | 50 | 50 | 50 | 50 | 50 | 50 | 50 | 50 | 50 | 50 | 50 | 50 | 50 |
| | Heat shrinkage ratio (80° C.) | Longitudinal dir. (%) | | −4.5 | −4.7 | −1 | 0.1 | 1.0 | 0.2 | 1.8 | −0.5 | 0.3 | −0.8 | −0.5 | −0.3 | 0 | −0.2 |
| | | Crosswise dir. (%) | | 37 | 37 | 40 | 38 | 40 | 41 | 41 | 38 | 40 | 37 | 38 | 37 | 37 | 39 |
| | Haze (%) (Entire/inner) | | | (4.2/2.7) | (3.3/1.6) | (6.0/2.0) | (5.9/5.3) | (5.4/5.2) | (5.4/5.2) | (4.8/4.6) | (5.7/3.5) | (5.0/3.6) | (5.3/3.9) | (4.8/3.5) | (4.7/3.4) | (4.9/3.4) | (4.8/3.5) |
| | Rupture elongation (%) | 23° C. | | 442 | 365 | — | 393 | 396 | 558 | 121 | 394 | 225 | 184 | 153 | 192 | 104 | 102 |
| | | 0° C. | | 341 | 284 | 232 | 345 | 284 | 355 | 255 | 264 | 199 | 142 | 258 | 161 | 136 | 162 |
| | Appearance | | | ●● | ●● | ●○ | ●● | ●● | ●● | ●●● | ●○ | ●○ | ○○ | ○○ | ○○ | ○○ | ○○ |
| | Shrink finishing quality | | | ●● | ●○ | ○○ | ●● | ●● | ●● | ●● | ●● | ●○ | ●○ | ●○ | ●○ | ●○ | ●○ |
| | Comprehensive evaluation | | | ● | ● | ○ | ● | ● | ● | ● | ● | ○ | ○ | ○ | ○ | ○ | ○ |

TABLE 3

| Layer composition | | | | Comparative examples | | | | | | |
|---|---|---|---|---|---|---|---|---|---|---|
| | | | | 1 | 2 | 3 | 4 | 5 | 6 | 7 |
| Film composition | 1st layer | PLA resin (% by mass) | NW4050 | | | 80 | 80 | 80 | 80 | 80 |
| | | | NW4060 | 27 | 27 | | | | | |
| | | | NW4042 | 13 | 13 | | | | | |
| | | | D/L ratio | 9.5 | 9.5 | 5 | 5 | 5 | 5 | 5 |
| | | PO resin (% by mass) | V2400 | 50 | 55 | | | | | |
| | | | A5200 | 10 | 5 | | | | | |
| | | Other resins (% by mass) | VH01 | | | | | | 20 | |
| | | | FA | | | | | | | 20 |
| | | | FY6H | | | 20 | | | | |
| | | | FH3315 | | | | 20 | | | |
| | | | KF271 | | | | | 20 | | |
| | | Storage elastic modulus of PO or Soft AC resin (10 Hz) | 20° C. (MPa) | 23 | 17 | 2000 | 2000 | 400 | 3100 | 1400 |
| | | | 70° C. (MPa) | 5 | 4 | 700 | 400 | 100 | 1800 | 10 |
| | | Mass ratio of PLA/(PO or Soft AC) resin (equiv. 100% by mass) | | 40/60 | 40/60 | 80/20 | 80/20 | 80/20 | 80/20 | 80/20 |
| | Elongation in the crosswise direction | | Preheating temperature | 80 | 80 | 74 | 70 | 68 | 85 | 75 |
| | | | Elongation temperature | 75 | 75 | 69 | 66 | 63 | 80 | 70 |
| | | | Magnification (times) | 5 | 5 | 4 | 4 | 4 | 4 | 4 |
| Evaluation | Film thickness (μm) | | | 50 | 50 | 50 | 50 | 50 | 50 | 50 |
| | Heat shrinkage ratio (80° C.) | | Longitudinal dir. (%) | 0.8 | 1.7 | 0.5 | 3.3 | 2.5 | 1 | 6 |
| | | | Crosswise dir. (%) | 40 | 36 | 63 | 61 | 62 | 57 | 58 |
| | Haze (%) (Entire/inner) | | | (43.9/5.3) X | (39.4/4.8) X | (89/89) X | (85/85) X | (89/78) X | (3.5/2.4) ⦿ | (5.5/4.4) ⦿ |
| | Rupture elongation (%) | | 23° C. | 607 | 607 | 26 | 383 | 495 | — | — |
| | | | 0° C. | 494 ⦿ | 524 ⦿ | 27 X | 11 X | 460 ⦿ | 5 X | 11 X |
| | Appearance | | | X | X | X | X | X | ⦿ | ⦿ |
| | Shrink finishing quality | | | ○ | ○ | ⦿ | ⦿ | ⦿ | ⦿ | ⦿ |
| | Comprehensive evaluation | | | X | X | X | X | X | X | X |

As shown in Tables 1 and 2, the heat-shrinkable films defined by the present invention (Examples 1 to 29) exhibited excellent heat-shrinkable property, impact resistance, transparency, and shrink finishing quality. On the other hand, as shown in Table 3, the films in which mass ratio between the polylactic acid resin and the polyolefin resin or the soft acrylic resin was beyond the range determined by the invention (Comparative examples 1 and 2) showed poor appearance due to deterioration of transparency by poor dispersion. Moreover, the films (Comparative examples 3 and 4) whose storage elastic modulus at 20 degree C. was beyond the upper limit of the invention, i.e. 100 MPa showed low rupture elongation (in the longitudinal direction), poor impact resistance, poor transparency due to high haze, and poor appearance as voids were observed. In the same manner, the film (Comparative example 5) whose storage elastic modulus at 20 degree C. was beyond the upper limit determined by the invention, i.e. 100 MPa showed excellent rupture elongation (in the longitudinal direction); however, its transparency was poor due to high haze and the appearance was also poor as whitening effect was observed. Further, the films (Comparative examples 6 and 7) using the acrylic resin other than the soft acrylic resin exhibited excellent transparency; however, its rupture elongation (in the longitudinal direction) was low and the impact resistance was poor.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that heat-shrinkable film with such an alternation are included in the technical scope of the invention.

The invention claimed is:

1. A heat-shrinkable film consisting of a layer or comprising at least one layer,
    wherein the layer is made of a mixed resin containing a polylactic acid resin and a soft acrylic resin as the main components,
    wherein mass ratio of the polylactic acid resin and the soft acrylic resin is 95/5 to 50/50 by mass,
    the polylactic acid resin being a copolymer of D-lactic acid and L-lactic acid or a mixed resin of the copolymer,
    the soft acrylic resin comprises: at least one polymer block (A) composed of an acrylic acid ester (a); and at least one polymer block (B) composed of a (meth) acrylic acid ester (b-1) whose chemical structure is different from that of the acrylic acid ester (a),
    the storage elastic modulus (E') of the soft acrylic resin at 20 degree C. being 100 MPa or less as measured at an oscillation frequency of 10 Hz and a strain of 0.1%,
    the film being stretched in at least one direction,
    the heat shrinkage ratio of the film in the main shrinking direction being 20% or more as measured after the film is immersed in hot water of 80 degree C. for 10 seconds, and the heat shrinkage ratio of the film in the direction perpendicular to the main shrinking direction being 10% or less after the film is immersed in hot water of 80 degree C. for 10 seconds.

2. The heat-shrinkable film according to claim 1, wherein D/L ratio of D-lactic acid and L-lactic acid is 3/97 to 15/85 or 85/15 to 97/3.

3. The heat-shrinkable film according to claim 1, wherein the acrylic acid ester (a) and the (meth) acrylic acid ester (b-1) are at least one respectively selected from the group consisting of: methyl methacrylate, ethyl acrylate, n-butyl acrylate, and 2-ethylhexyl acrylate.

4. The heat-shrinkable film according to claim 1, wherein the storage elastic modulus (E') of the soft acrylic resin at 70 degree C. is 0.1 MPa or more and 50 MPa or less as measured at an oscillation frequency of 10 Hz and a strain of 0.1%.

5. The heat-shrinkable film according to claim 1, wherein the rupture elongation in the direction perpendicular to the main shrinking direction is 100% or more as measured at an ambient temperature of 0 degree C. and a strain rate of 100 mm/min.

6. A molded product comprising the heat-shrinkable film according to claim 1 as a base material.

7. A heat-shrinkable label comprising the heat-shrinkable film according to claim 1 as a base material.

8. A container, employing the molded product according to claim 6.

9. A container, having the heat-shrinkable label according to claim 7 fitted thereon.

10. The heat-shrinkable film according to claim 1, wherein the mixed resin contains a (meth) acrylic resin apart from the soft acrylic resin.

11. The heat-shrinkable film according to claim 1, wherein the mixed resin contains a soft-type resin selected from the group consisting of an aliphatic polyester resin other than polylactic acid resin; an aromatic-aliphatic polyester resin; a copolymer of diol, dicarboxylic acid, and lactic acid resin; and a core-shell type rubber.

12. The heat-shrinkable film according to claim 1, wherein the film comprises a laminated structure of the layer and at least one other layer, wherein the other layer containing polylactic acid resin as the main component.

13. A method for manufacturing the heat-shrinkable film according to claim 1, wherein the method comprises the step of stretching a planar film in at least one direction,
wherein
the planar film consists of a layer or comprising at least one layer,
the layer is made of a mixed resin containing a polylactic acid resin and a soft acrylic resin as the main components,
mass ratio of the polylactic acid resin and the soft acrylic resin is 95/5 to 50/50 by mass,
the polylactic acid resin is a copolymer of D-lactic acid and L-lactic acid or a mixed resin of the copolymer,
the soft acrylic resin comprises: at least one polymer block (A) composed of an acrylic acid ester (a); and at least one polymer block (B) composed of a (meth) acrylic acid ester (b-1) whose chemical structure is different from that of the acrylic acid ester (a), and
the storage elastic modulus (E') of the soft acrylic resin at 20 degree C. is 100 MPa or less as measured at an oscillation frequency of 10 Hz and a strain of 0.1%,
wherein the stretching magnification in the main shrinking direction of the film is twice or more, and the stretching magnification in the direction perpendicular to the main shrinking direction of the film is the same magnification or more and twice or less, and the stretching temperature is 60 degree C. or more and 100 degree C. or less.

14. The heat-shrinkable film according to claim 1, wherein the heat shrinkage ration of the film in the direction perpendicular to the main shrinking direction being 3% or less after the film immersed in hot water of 80 degree C. for 10 seconds.

* * * * *

UNITED STATES PATENT AND TRADEMARK OFFICE
CERTIFICATE OF CORRECTION

PATENT NO. : 9,206,312 B2
APPLICATION NO. : 13/777033
DATED : December 8, 2015
INVENTOR(S) : Takashi Hiruma et al.

It is certified that error appears in the above-identified patent and that said Letters Patent is hereby corrected as shown below:

Specification

At columns 25 and 26, delete the table in its entirety and replace with the following:

Signed and Sealed this
Twelfth Day of July, 2016

Michelle K. Lee
*Director of the United States Patent and Trademark Office*

At columns 27 and 28, delete the table in its entirety and replace with the following:

[Table 2]

| | | | | Examples | | | | | | | | | | | | | |
|---|---|---|---|---|---|---|---|---|---|---|---|---|---|---|---|---|---|
| | | | | 16 | 17 | 18 | 19 | 20 | 21 | 22 | 23 | 24 | 25 | 26 | 27 | 28 | 29 |
| Film composition | 1st layer | PLA resin (% by mass) | NW4050 | | | | | | | | | | | | | | |
| | | | NW4060 | 40 | 33 | 70 | 47 | 40 | 47 | 40 | 47 | 40 | 47 | 40 | 47 | 40 | 40 |
| | | | NW4042 | 20 | 17 | | 23 | 20 | 23 | 20 | 23 | 20 | 23 | 20 | 23 | 20 | 20 |
| | | | D/L ratio | 9.4 | 9.4 | 12 | 9.5 | 9.4 | 9.5 | 9.4 | 9.5 | 9.4 | 9.5 | 9.4 | 9.5 | 9.4 | 9.4 |
| | | PO resin (% by mass) | T5312 | | | 20 | | | | | | | | | | | |
| | | | V2300 | | | | | | | | | | | | | | |
| | | | V2400 | 27 | 27 | | 20 | 30 | 25 | 35 | 27 | 37 | 28 | 38 | 29 | 39 | 40 |
| | | | KS240T | | | | | | | | | | | | | | |
| | | | EV270 | | | | | | | | | | | | | | |
| | | | A5200 | 3 | 3 | | 10 | 10 | 5 | 5 | 3 | 3 | 2 | 2 | 1 | 1 | |
| | | Other resins (% by mass) | S2001 | | | 10 | | | | | | | | | | | |
| | | | HT50Y | 10 | 20 | | | | | | | | | | | | |
| | | Storage elastic modulus of PO or Soft AC resin (10Hz) | 20°C (MPa) | 18 | 18 | 3 | 35 | 29 | 23 | 20 | 18 | 16 | 15 | 14 | 13 | 12 | 10 |
| | | | 70°C (MPa) | 4 | 4 | 2 | 6 | 5 | 5 | 4 | 4 | 4 | 3 | 3 | 3 | 3 | 3 |
| | | Mass ratio of PLA/(PO or Soft AC) resin (equiv. 100% by mass) | | 67/33 | 83/37 | 78/22 | 70/30 | 60/40 | 70/30 | 60/40 | 70/30 | 60/40 | 70/30 | 60/40 | 70/30 | 60/40 | 60/40 |
| | 2nd layer | PLA resin | NW4050 | | | 45 | | | | | | | | | | | |
| | | | NW4060 | 60 | 60 | 45 | 60 | 60 | 60 | 60 | 60 | 60 | 60 | 60 | 60 | 60 | 60 |
| | | | NW4042 | 30 | 30 | | 30 | 30 | 30 | 30 | 30 | 30 | 30 | 30 | 30 | 30 | 30 |
| | | | PD150 | 10 | 10 | 10 | 10 | 10 | 10 | 10 | 10 | 10 | 10 | 10 | 10 | 10 | 10 |
| | | | D/L ratio | 9.4 | 9.4 | 8.5 | 9.4 | 9.4 | 9.4 | 9.4 | 9.4 | 9.4 | 9.4 | 9.4 | 9.4 | 9.4 | 9.4 |
| Elongation in the crosswise direction | | | Preheating temperature | 85 | 85 | 74 | 80 | 80 | 80 | 80 | 80 | 80 | 80 | 80 | 80 | 80 | 80 |
| | | | Elongation temperature | 80 | 80 | 69 | 75 | 75 | 75 | 75 | 75 | 75 | 75 | 75 | 75 | 75 | 75 |
| | | | Magnification (times) | 5 | 5 | 4 | 5 | 5 | 5 | 5 | 5 | 5 | 5 | 5 | 5 | 5 | 5 |
| Film thickness (μm) | | | | 50 | 50 | 50 | 50 | 50 | 50 | 50 | 50 | 50 | 50 | 50 | 50 | 50 | 50 |
| Evaluation | Heat shrinkage ratio (80°C) | | Longitudinal dir. (%) | -4.5 | -4.7 | -1 | 0.1 | 1.0 | 0.2 | 1.8 | -0.5 | 0.3 | -0.8 | -0.5 | -0.3 | 0 | -0.2 |
| | | | Crosswise dir. (%) | 37 | 37 | 40 | 38 | 40 | 41 | 41 | 38 | 40 | 37 | 38 | 37 | 37 | 39 |
| | Haze (%) (Entire/inner) | | | (4.2/2.7) | (3.3/1.8) | (6.0/2.0) | (5.5/5.3) | (5.4/5.2) | (5.4/5.2) | (4.8/4.6) | (5.7/3.5) | (5.0/3.6) | (5.3/3.9) | (4.8/3.5) | (4.7/3.4) | (4.9/3.4) | (4.8/3.5) |
| | | | | ○ | ○ | ○ | ○ | ○ | ○ | ○ | ○ | ○ | ○ | ○ | ○ | ○ | ○ |
| | Rupture elongation (%) | | 23°C | 442 | 365 | — | 393 | 396 | 558 | 121 | 394 | 225 | 184 | 153 | 192 | 104 | 102 |
| | | | 0°C | 341 | 284 | 232 | 345 | 284 | 358 | 265 | 264 | 198 | 142 | 256 | 161 | 136 | 162 |
| | | | | ○ | ○ | ○ | ○ | ○ | ○ | ○ | ○ | ○ | ○ | ○ | ○ | ○ | ○ |
| | Appearance | | | ○ | ○ | ○ | ○ | ○ | ○ | ○ | ○ | ○ | ○ | ○ | ○ | ○ | ○ |
| | Shrink finishing quality | | | ○ | ○ | ○ | ○ | ○ | ○ | ○ | ○ | ○ | ○ | ○ | ○ | ○ | ○ |
| | Comprehensive evaluation | | | ○ | ○ | ○ | ○ | ○ | ○ | ○ | ○ | ○ | ○ | ○ | ○ | ○ | ○ |

At columns 29 and 30, delete Table 3 in its entirety and replace with the following:

(Table 3)

| | Layer composition | | | Comparative examples | | | | | | |
|---|---|---|---|---|---|---|---|---|---|---|
| | | | | 1 | 2 | 3 | 4 | 5 | 6 | 7 |
| Film composition | 1st layer | PLA resin (% by mass) | NW4050 | | | 80 | 80 | 80 | 80 | 80 |
| | | | NW4060 | 27 | 27 | | | | | |
| | | | NW4042 | 13 | 13 | | | | | |
| | | | D/L ratio | 9.5 | 9.5 | 5 | 5 | 5 | 5 | 5 |
| | | PO resin (% by mass) | V2400 | 50 | 55 | | | | | |
| | | | A5200 | 10 | 5 | | | | | |
| | | Other resins (% by mass) | VH01 | | | | | | 20 | |
| | | | FA | | | | | | | 20 |
| | | | FY6H | | | 20 | | | | |
| | | | FH3315 | | | | 20 | | | |
| | | | KF271 | | | | | 20 | | |
| | | Storage elastic modulus of PO or Soft AC resin (10Hz) | 20°C (MPa) | 23 | 17 | 2000 | 2000 | 400 | 3100 | 1400 |
| | | | 70°C (MPa) | 5 | 4 | 700 | 400 | 100 | 1800 | 10 |
| | | Mass ratio of PLA/(PO or Soft AC) resin (equiv. 100% by mass) | | 40/60 | 40/60 | 80/20 | 80/20 | 80/20 | 80/20 | 80/20 |
| Elongation in the crosswise direction | | Preheating temperature | | 80 | 80 | 74 | 70 | 68 | 85 | 75 |
| | | Elongation temperature | | 75 | 75 | 69 | 66 | 63 | 80 | 70 |
| | | Magnification (times) | | 5 | 5 | 4 | 4 | 4 | 4 | 4 |
| Film thickness (μm) | | | | 50 | 50 | 50 | 50 | 50 | 50 | 50 |
| Evaluation | Heat shrinkage ratio (80°C) | Longitudinal dir. (%) | | 0.8 | 1.7 | 0.5 | 3.3 | 2.5 | 1 | 6 |
| | | Crosswise dir. (%) | | 40 | 36 | 63 | 61 | 62 | 57 | 58 |
| | Haze (%) (Entire/inner) | | | (43.9/5.3) x | (39.4/4.8) x | (89/89) x | (85/85) x | (89/78) x | (3.5/2.4) ⊚ | (5.5/4.4) ⊚ |
| | Rupture elongation (%) | 23°C | | 607 | 607 | 26 | 383 | 495 | — | — |
| | | 0°C | | 484 ⊚ | 524 ⊚ | 27 x | 11 x | 460 ⊚ | 5 x | 11 x |
| | Appearance | | | x | x | x | x | x | ⊚ | ⊚ |
| | Shrink finishing quality | | | O | O | ⊚ | ⊚ | ⊚ | ⊚ | ⊚ |
| | Comprehensive evaluation | | | x | x | x | x | x | x | x |